(12) United States Patent
Kusama et al.

(10) Patent No.: US 9,523,799 B2
(45) Date of Patent: Dec. 20, 2016

(54) METHOD FOR PRODUCING LIGHT DIFFUSION FILM AND LIGHT DIFFUSION FILM

(71) Applicant: LINTEC Corporation, Itabashi-ku, Tokyo (JP)

(72) Inventors: Kentaro Kusama, Tokyo (JP); Tomoo Orui, Tokyo (JP); Kenta Tomioka, Tokyo (JP); Satoru Shoshi, Tokyo (JP)

(73) Assignee: LINTEC CORPORATION, Tokyo (JP)

( * ) Notice: Subject to any disclaimer, the term of this patent is extended or adjusted under 35 U.S.C. 154(b) by 77 days.

(21) Appl. No.: 14/372,260

(22) PCT Filed: Dec. 20, 2012

(86) PCT No.: PCT/JP2012/083007
§ 371 (c)(1),
(2) Date: Jul. 15, 2014

(87) PCT Pub. No.: WO2013/108539
PCT Pub. Date: Jul. 25, 2013

(65) Prior Publication Data
US 2014/0340752 A1    Nov. 20, 2014

(30) Foreign Application Priority Data
Jan. 19, 2012    (JP) .................................. 2012-008985

(51) Int. Cl.
*G02B 5/02*    (2006.01)
*G02B 26/02*    (2006.01)
*G02F 1/1335*    (2006.01)

(52) U.S. Cl.
CPC ............. *G02B 5/0268* (2013.01); *G02B 5/021* (2013.01); *G02B 5/0236* (2013.01); *G02B 26/023* (2013.01); *G02F 1/133504* (2013.01)

(58) Field of Classification Search
USPC ........ 428/156, 167, 169, 172; 359/599, 601, 359/609, 613
See application file for complete search history.

(56) References Cited

U.S. PATENT DOCUMENTS 4,082,433 A * 4/1978 Appeldorn ............... G02B 3/08
359/601
4,221,867 A * 9/1980 McFadden ........... G01N 21/253
356/244

(Continued)

FOREIGN PATENT DOCUMENTS

CN       101189538 A    5/2008
EP       0272582 A2     6/1988
(Continued)

*Primary Examiner* — Bumsuk Won
*Assistant Examiner* — Balram Parbadia
(74) *Attorney, Agent, or Firm* — Fitch, Even, Tabin & Flannery LLP

(57) ABSTRACT

A method for producing a light diffusion film having first and second louver structure regions includes the following steps (a) to (d): (a) preparing a composition for light diffusion film; (b) applying the composition for light diffusion film, and forming a coating layer; (c) performing first active energy ray irradiation, and forming a first louver structure region in the lower part of the coating layer, while leaving a louver structure-unformed region in the upper part of the coating layer; and (d) performing second active energy ray irradiation, and forming a second louver structure region in the louver structure-unformed region.

8 Claims, 23 Drawing Sheets

(56) References Cited

U.S. PATENT DOCUMENTS

| | | | | |
|---|---|---|---|---|
| 6,398,370 | B1* | 6/2002 | Chiu | G02B 5/003 359/601 |
| 7,072,096 | B2* | 7/2006 | Holman | F21S 8/08 257/E25.02 |
| 7,944,530 | B2* | 5/2011 | Nagai | G02B 5/3016 252/299.01 |
| 2006/0057307 | A1* | 3/2006 | Matsunaga | B32B 27/08 428/1.31 |
| 2007/0268586 | A1* | 11/2007 | Mimura | G02B 5/003 359/599 |
| 2008/0090063 | A1 | 4/2008 | Inokuma et al. | |
| 2008/0130121 | A1* | 6/2008 | Kim | H01J 1/74 359/601 |
| 2008/0137222 | A1* | 6/2008 | Park | B29D 11/00634 359/885 |
| 2008/0248250 | A1* | 10/2008 | Flemming | C03C 3/095 428/156 |
| 2010/0033827 | A1* | 2/2010 | Foley | G02B 5/045 359/614 |
| 2011/0080538 | A1* | 4/2011 | Shiota | G03F 7/0007 349/61 |
| 2012/0051032 | A1* | 3/2012 | Aoyama | G02B 5/00 362/97.2 |

FOREIGN PATENT DOCUMENTS

| | | |
|---|---|---|
| EP | 0762154 A2 | 3/1997 |
| JP | 63-309902 A | 12/1988 |
| JP | 64-40905 A | 2/1989 |
| JP | 9-127331 A | 5/1997 |
| JP | 11-133213 A | 5/1999 |
| JP | 2003-90905 A | 3/2003 |
| JP | 3480260 B | 10/2003 |
| JP | 2005-37802 A | 2/2005 |
| JP | 2005-316354 A | 11/2005 |
| JP | 2005-326824 A | 11/2005 |
| JP | 2006-119241 A | 5/2006 |
| JP | 3829601 B2 | 7/2006 |
| JP | 2006-323379 A | 11/2006 |
| JP | 2006-350290 A | 12/2006 |
| JP | 2007-293288 A | 11/2007 |
| JP | 2008-239757 A | 10/2008 |
| JP | 2011-191780 A | 9/2011 |

* cited by examiner

θ1=35°

θ1=35°

θ1=30°

METHOD FOR PRODUCING LIGHT DIFFUSION FILM AND LIGHT DIFFUSION FILM

TECHNICAL FIELD

The present invention relates to a method for producing a light diffusion film, and a light diffusion film.

More particularly, the present invention relates to a method for producing a light diffusion film, which can easily adjust the combination of the inclination angles of plate-shaped regions in plural louver structure regions, and can also efficiently produce a light diffusion film having an effectively expanded light diffusion angle region, and a light diffusion film obtainable by the method.

BACKGROUND ART

In conventional liquid crystal display devices, a predetermined image can be recognized by utilizing light emitted from a light source provided inside the device (internal light source).

However, with the popularization of mobile telephones, on-board televisions for vehicles, and the like in recent years, there are increasing opportunities of viewing liquid crystal display screens outdoors, and along therewith, there is also a problem that the light intensity from an internal light source is lower than that of outdoor light, and a predetermined screen is made not easily visible.

Furthermore, in mobile applications such as mobile telephones, since the electric power consumption by an internal light source of a liquid crystal display device occupies a large proportion of the total electric power consumption, when the internal light source is used heavily, there is a problem that the duration time of the battery is shortened.

Thus, in order to address these problems, reflective liquid crystal display devices that utilize external light as a light source have been developed.

With such a reflective liquid crystal display device, since external light is utilized as a light source, images can be recognized more clearly when the external light is more intense, and the electric power consumption of an internal light source can also be effectively suppressed.

That is, in regard to such a reflective liquid crystal display device, it has been suggested to incorporate a light diffusion film intended for efficient light diffusion so that external light can be efficiently transmitted to be introduced into the interior of a liquid crystal display device, and the external light can be effectively utilized as a light source (for example, Patent Document 1).

To explain more specifically, Patent Document 1 discloses a liquid crystal device (1112) which includes, as illustrated in FIG. 24(a) to FIG. 24(b), a liquid crystal cell including an upper substrate 1103, a lower substrate 1107, and a liquid crystal layer 1105 interposed therebetween; a light reflecting plate 1110 provided on the side of the lower substrate 1107; and a light control plate (light diffusion film) 1108 provided between the liquid crystal layer 1105 and the light reflecting plate 1110.

Further, a light control plate 1108 for selectively scattering light that is incident at a predetermined angle and also for transmitting light that is incident at angles other than the predetermined light, is provided, and such a light control plate 1108 is disposed in the liquid crystal cell such that the scattering axis direction 1121, which corresponds to the direction of selectively scattering the light incident at a predetermined angle, being projected on the surface of the light control plate 1108, is arranged to be in the direction of almost six o'clock in the liquid crystal cell plane.

Furthermore, regarding the light diffusion film that is used in a reflective liquid crystal display device, various forms are known. However, particularly, a light diffusion film having, within the film, a louver structure that can control the light direction or regulate light dispersibility by having long and thin plate-shaped high refractive index regions and long and thin plate-shaped low refractive index regions arranged alternately in parallel along any one direction along the film plane, is widely used (for example, Patent Documents 2 to 4).

That is, Patent Document 2 discloses a light control film (light diffusion film) which is obtained by irradiating a film-like composition containing plural kinds of compounds having polymerizable carbon-carbon double bonds, with ultraviolet radiation from a particular direction, and curing the composition, and is capable of selectively scattering only light incident at an angle in a particular range, characterized in that at least one compound included in the composition is a compound having plural aromatic rings and one polymerizable carbon-carbon double bond in the molecule.

Furthermore, Patent Document 3 discloses a photocurable composition characterized by containing (A) a fluorene-based compound having a polymerizable carbon-carbon double bond in the molecule; (B) a cation polymerizable compound having a refractive index that is different from that of the fluorene-based compound (A); and (C) a photo-cation polymerization initiator, and a light control film formed by curing the photocurable composition.

Furthermore, Patent Document 4 discloses a composition for light diffusion film including at least (A) a bisphenol A type epoxy resin or brominated bisphenol A type epoxy resin represented by Formula (5); (B) a radical-polymerizable compound having at least one or more ethylenically unsaturated bonds in the structural unit; (D) a photopolymerization initiator generating a radical species by chemical radiation; and (E) a thermal polymerization initiator generating a cation species by heat, and a light diffusion film produced using the composition. More specifically, a composition for light diffusion film characterized in that at normal temperature, the refractive index of the (B) radical polymerizable compound is lower than the refractive indices of the (A) bisphenol A type epoxy resin or brominated bisphenol A type epoxy resin, and the (C) compound having at least one cationic polymerizable group in the molecule, and a light diffusion film produced using the composition.

[Chemical Formula 1]

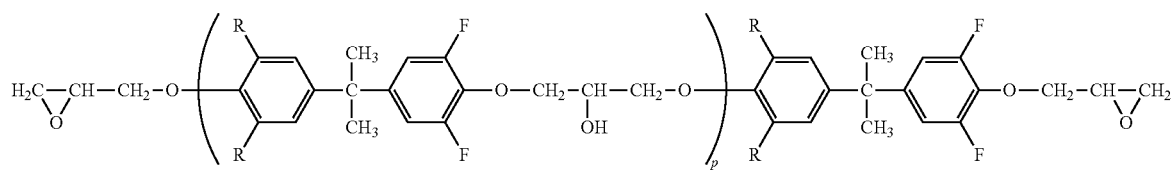

(5)

wherein in Formula (5), R represents a hydrogen atom or a bromine atom; and the number of repetitions p represents a natural number.

Furthermore, there has been disclosed a method of laminating light diffusion films so that the width of the light diffusion incident angle region can be further expanded (for example Patent Document 5).

That is, Patent Document 5 discloses a screen for projection characterized by being formed by laminating plural sheets of light control films (light diffusion films), in each of which the fog value is angle-dependent, and when light enters at an angle of 0° to 180° with respect to the surface, the light scattering angle range that exhibits a fog value of 60% or higher is 30° or more.

Furthermore, as another method of expanding the width of the light diffusion incident angle region, there has also been disclosed a method of further applying a composition for light diffusion film on a light diffusion film that has been prepared in advance, and then photocuring the composition so as to form two louver structures in the film (for example, Patent Document 6).

That is, Patent Document 6 discloses a method for producing a light control plate (light diffusion film), the method including a first step of retaining on a film a resin composition composed of plural compounds, each having one or more polymerizable carbon-carbon double bonds in the molecule and having a refractive index that is different from the refractive indices of the other compounds, irradiating the composition with ultraviolet radiation from a particular direction, and thereby curing the resin composition; and a second step of retaining (applying) the resin composition on the film of the cured product thus obtained, irradiating the resin composition with ultraviolet radiation from a direction different from that of the first step, and thereby curing the resin composition, characterized in that the second step is repeated as necessary.

Furthermore, as still another method for expanding the width of the light diffusion incident angle region, there has also been disclosed a method of forming a louver structure which is bent to a predetermined extent in a film, by irradiating ultraviolet radiation having a particular wavelength distribution to a composition for light diffusion film (for example, Patent Document 7).

That is, Patent Document 7 discloses a method for producing a light control film (light diffusion film), the method including irradiating a film-like composition containing at least two compounds, each having a polymerizable carbon-carbon bond in the molecule and having a refractive index that is different from the refractive indices of the other compounds, with ultraviolet radiation through an interference filter having a transmittance of 0% to 60% at a wavelength of 313 nm, and thereby curing the composition.

In addition, although it is not a method intended to expand the width of the light diffusion incident angle region, but is a method intended to suppress the sticky feeling of a light diffusion film, there has been disclosed a method for producing a light diffusion film by performing light irradiation on a composition for light diffusion film in two times (for example, Patent Document 8).

That is, Patent Document 8 discloses a method for producing a light control plate (light diffusion film), characterized by irradiating a film-like body formed from a photopolymerizable composition formed on a sheet, with light from a particular direction, thereby curing the film-like body to obtain a cured film, subsequently laminating a transparent base material on the cured film so as to adhere closely, and then irradiating light.

CITATION LIST

Patent Document

Patent Document 1: Japanese Patent No. 3480260 (Claims)
Patent Document 2: JP 2006-350290 A (Claims)
Patent Document 3: JP 2008-239757 A (Claims)
Patent Document 4: Japanese Patent No. 3829601 (Claims)
Patent Document 5: JP 2005-316354 A (Claims)
Patent Document 6: JP 63-309902 A (Claims)
Patent Document 7: JP 2006-323379 A (Claims)
Patent Document 8: JP 11-133213 A (Claims)

DISCLOSURE OF THE INVENTION

Problem to be Solved by the Invention

However, since the light diffusion films disclosed in Patent Documents 1 to 4 each have only one louver structure formed in the film, the light diffusion angle region for light diffusion is narrow, and therefore, it has been difficult to utilize external light efficiently in a reflective liquid crystal display device.

Furthermore, from the viewpoint of cost reduction, when the film thickness of the film is decreased, uniformity in the intensity of diffused light in the light diffusion angle region may not be maintained, and the film exhibits a very strong peak at a predetermined angle within the light diffusion angle region.

This implies that at the relevant predetermined angle, incident light is not diffused, but is transmitted by the light diffusion film.

Therefore, when such a light diffusion film is applied to a reflective liquid crystal display device, there has been a problem that spots are generated in the display screen, and visibility becomes very poor.

On the other hand, the light diffusion film disclosed in Patent Document 5 can have the width of the light diffusion incident angle region expanded to a certain extent, but due to the lamination of plural light diffusion films, the total film thickness is increased, and there has been a problem that clarity of the images is decreased, iridescent color (moiré phenomenon) appears, or a poor product yield is obtained.

Furthermore, also for the light diffusion film disclosed in Patent Document 6, the width of the light diffusion incident angle region can be expanded to a certain extent; however, since the light diffusion film has a configuration in which another light diffusion film is separately formed on each sheet of light diffusion film, not only a poor product yield is obtained, but also delamination is prone to occur. Furthermore, there has been a need for an improvement from the viewpoint of film thickness reduction.

Furthermore, for the light diffusion film disclosed in Patent Document 7, the light diffusion incident angle region can be expanded to a certain extent; however, since ultraviolet radiation having a particular wavelength distribution is irradiated, a particular interference filter must be used, and thus, there has been a problem that the production process becomes complicated.

Also, when the composition for light diffusion film contains a component having absorption characteristics directed to ultraviolet radiation having a particular wavelength, there has also been a problem that it is difficult to form a louver structure that is bent to a predetermined extent in the film, and it is difficult to produce a desired light diffusion film in a stable manner.

On the other hand, the light diffusion film disclosed in Patent Document 8 is characterized merely in that for the purpose of completely curing the light diffusion film so as to suppress the stickiness, light irradiation are carried out in two stages.

More specifically, since a louver structure is formed in the film by first light irradiation, and then diffused light is irradiated in second light irradiation, formation of a new louver structure or the like does not occur as a result of the second light irradiation, and this simply implies curing of the monomer components remaining in the film.

Therefore, the light diffusion film disclosed in Patent Document 8 has suffered from the same problems as those of Patent Documents 1 to 4.

Therefore, in the current situation, efficient production of a light diffusion film in which the light diffusion angle region has been effectively expanded, and the total film thickness has been sufficiently reduced, is still difficult to realize.

Thus, in view of such circumstances as described above, the inventors of the present invention conducted a thorough study, and they found that when a method for producing a light diffusion film including predetermined processes is carried out, a first louver structure region and a second louver structure region having predetermined structures can be efficiently formed in a same film, and thereby the problems described above can be solved. Thus, the inventors completed the present invention.

That is, an object of the present invention is to provide a method for producing a light diffusion film, which is capable of easily adjusting the combination of the inclination angles of plate-shaped regions in plural louver structure regions, and of efficiently producing a light diffusion film having increased uniformity of the intensity of diffused light in the light diffusion angle region, and an effectively expanded light diffusion angle region; and a light diffusion film obtainable thereby.

Means for Solving Problem

According to an aspect of the present invention, there is provided a method for producing a light diffusion film having a first louver structure region and a second louver structure region, in which plural plate-shaped regions having different refractive indices are alternately arranged in parallel along any one direction along the film plane, characterized by including the following steps (a) to (d). Thus, the problems described above can be solved.

(a) A step of preparing a composition for light diffusion film containing two polymerizable compounds having different refractive indices;

(b) a step of applying the composition for light diffusion film on a process sheet and forming a coating layer;

(c) a step of subjecting the coating layer to first active energy ray irradiation in an oxygen-containing atmosphere, and forming a first louver structure region in the lower part of the coating layer, while leaving a louver structure-unformed region in the upper part of the coating layer; and (d) a step of subjecting the coating layer to second active energy ray irradiation in a non-oxygen atmosphere, and forming a second louver structure region in the lover structure-unformed region.

That is, with the method for producing a light diffusion film of the present invention, since a coating layer formed from a predetermined composition for light diffusion film is subjected to first active energy ray irradiation in an oxygen-containing atmosphere (preferably, in an air atmosphere), while a first louver structure region is efficiently formed in the lower part of the coating layer, a louver structure-unformed region can be left stably in the upper part of the coating layer by utilizing the influence of oxygen inhibition.

Furthermore, since second active energy ray irradiation is performed in a non-oxygen atmosphere, the influence of oxygen inhibition is suppressed in the louver structure-unformed region thus obtained, and thereby a second louver structure region can be formed efficiently.

In addition, when the irradiation angle in each active energy ray irradiation is appropriately adjusted, the combination of the inclination angles of plate-shaped regions in the respective louver structure regions can be easily adjusted.

Therefore, with the method for producing a light diffusion film of the present invention, a light diffusion film having satisfactory incident angle dependency in connection with transmission and diffusion of light, having high uniformity of diffused light in a light diffusion angle region, and having an effective expanded light diffusion angle region, can be produced efficiently.

Meanwhile, according to the present invention, the "light diffusion incident angle region" means, in relation to a light diffusion film, the range of angles of incident light corresponding to the emission of diffused light in a case in which the angle of incident light from a point light source is changed.

On the other hand, according to the present invention, the "light diffusion angle region" means, in relation to a light diffusion film, the range of angles of diffused light obtainable in a state in which a point light source is fixed at an angle at which incident light is diffused to the largest extent.

Here, in regard to the light diffusion film according to the present invention, in view of characteristics, the width of the light diffusion angle region and the width of the light diffusion incident angle region are approximately the same.

Furthermore, the term "satisfactory incident angle dependency" means that the distinction between the light diffusion incident angle region and the non-diffusion incident angle region in which incident light is directly transmitted without being diffused, is controlled definitely.

Furthermore, on the occasion of carrying out the method for producing a light diffusion film of the present invention, in regard to the first and second active energy ray irradiation, it is preferable to irradiate active energy rays linearly to the surface of the coating layer.

When the production method is carried out in this manner, the first louver structure region and the second louver structure region can be formed more efficiently.

Furthermore, on the occasion of carrying out the method for producing a light diffusion film of the present invention, it is preferable to adjust the absolute value of the difference between the irradiation angle for the first active energy ray irradiation and the irradiation angle for the second active energy ray irradiation to a value of 1° or more.

When the production method is carried out in this manner, the light diffusion angle region in the light diffusion film thus obtainable can be expanded more effectively.

Furthermore, on the occasion of carrying out the method for producing a light diffusion film of the present invention, it is preferable to adjust the illuminance of the coating layer for the first active energy ray irradiation to a value in the range of 0.1 mW/cm$^2$ to 3 mW/cm$^2$.

When the production method is carried out in this manner, the louver structure-unformed region can be left more stably, while having the first louver structure region formed efficiently.

Meanwhile, the term illuminance as used herein means the measurement value in an area where the active energy rays irradiated to the coating layer surface exhibits the maximum value.

Furthermore, on the occasion of carrying out the method for producing a light diffusion film of the present invention, it is preferable to adjust the amount of light at the coating layer surface for the first active energy ray irradiation to a value in the range of 5 mJ/cm$^2$ to 100 mJ/cm$^2$.

When the production method is carried out in this manner, the louver structure-unformed region can be left more stably, while having the first louver structure region formed efficiently.

Furthermore, on the occasion of carrying out the method for producing a light diffusion film of the present invention, it is preferable to adjust the illuminance of the coating layer surface for the second active energy ray irradiation to a value in the range of 0.1 mW/cm$^2$ to 20 mW/cm$^2$.

When the production method is carried out in this manner, the second louver structure region can be formed more efficiently in the louver structure-unformed region.

Meanwhile, the term illuminance as used herein means, similarly to the case of the first active energy ray irradiation, the measurement value in the area where the active energy rays irradiated to the coating layer surface exhibits the maximum value.

Furthermore, on the occasion of carrying out the method for producing a light diffusion film of the present invention, it is preferable to adjust the amount of light at the coating layer surface for the second active energy ray irradiation to a value in the range of 5 mJ/cm$^2$ to 300 mJ/cm$^2$.

When the production method is carried out in this manner, the second louver structure region can be formed more efficiently in the louver structure-unformed region.

Furthermore, on the occasion of carrying out the method for producing a light diffusion film of the present invention, it is preferable to perform, in step (d), the second active energy ray irradiation to the surface of the coating layer in a state of having an active energy ray transmitting sheet laminated thereon.

When the production method is carried out in this manner, the influence of oxygen inhibition can be suppressed more effectively, and the second louver structure region can be formed more efficiently in the louver structure-unformed region.

Meanwhile, in this case, the illuminance and amount of light described above mean values at the surface of the active energy ray transmitting sheet.

Furthermore, according to another aspect of the present invention, there is provided a light diffusion film having a first louver structure region and a second louver structure region, in which plural plate-shaped regions having different refractive indices are alternately arranged in parallel along any one direction along the film plane, the light diffusion film being obtainable by a production method including the following steps (a) to (d):

(a) a step of preparing a composition for light diffusion film containing two polymerizable compounds having different refractive indices;

(b) a step of applying the composition for light diffusion film on a process sheet, and forming a coating layer;

(c) a step of subjecting the coating layer to first active energy ray irradiation in an oxygen-containing atmosphere, and forming a first louver structure region in the lower part of the coating layer, while leaving a louver structure-unformed region in the upper part of the coating layer; and (d) a step of subjecting the coating layer to second active energy ray irradiation in a non-oxygen atmosphere, and forming a second louver structure region in the louver structure-unformed region.

That is, when the light diffusion film of the present invention is used, since the light diffusion film has a first louver structure region and a second louver structure region within the film, the film has satisfactory incident angle dependency in connection with transmission and diffusion of light, and has excellent uniformity of diffused light in the light diffusion angle region, so that the light diffusion angle region can be effectively expanded.

EMBODIMENTS FOR CARRYING OUT THE INVENTION

First Exemplary Embodiment

A first exemplary embodiment of the present invention is a method for producing a light diffusion film having a first louver structure region and a second louver structure region, in which plural plate-shaped regions having different refractive indices are alternately arranged in parallel along any one direction along the film plane, characterized in that the method includes the following steps (a) to (d):

(a) a step of preparing a composition for light diffusion film containing two polymerizable compounds having different refractive indices;

(b) a step of applying the composition for light diffusion film on a process sheet, and forming a coating layer;

(c) a step of subjecting the coating layer to first active energy ray irradiation in an oxygen-containing atmosphere (preferably, in an air atmosphere), and forming a first louver structure region in the lower part of the coating layer, while leaving a louver structure-unformed region in the upper part of the coating layer; and (d) a step of subjecting the coating layer to second active energy ray irradiation in a non-oxygen atmosphere, and forming a second louver structure region in the louver structure-unformed region.

Hereinafter, the first exemplary embodiment of the present invention will be explained specifically with appropriate reference to the drawings, and in order to facilitate the understanding of such explanation, first, the fundamental principle of a light diffusion film, and the fundamental configuration of light diffusion in a predetermined light diffusion film obtainable according to the method for producing a light diffusion film of the present invention will be explained.

1. Fundamental Principle of Light Diffusion in Light Diffusion Film

First, the fundamental principle of light diffusion in a light diffusion film will be described using FIG. 1 and FIG. 2.

Figure 1A:
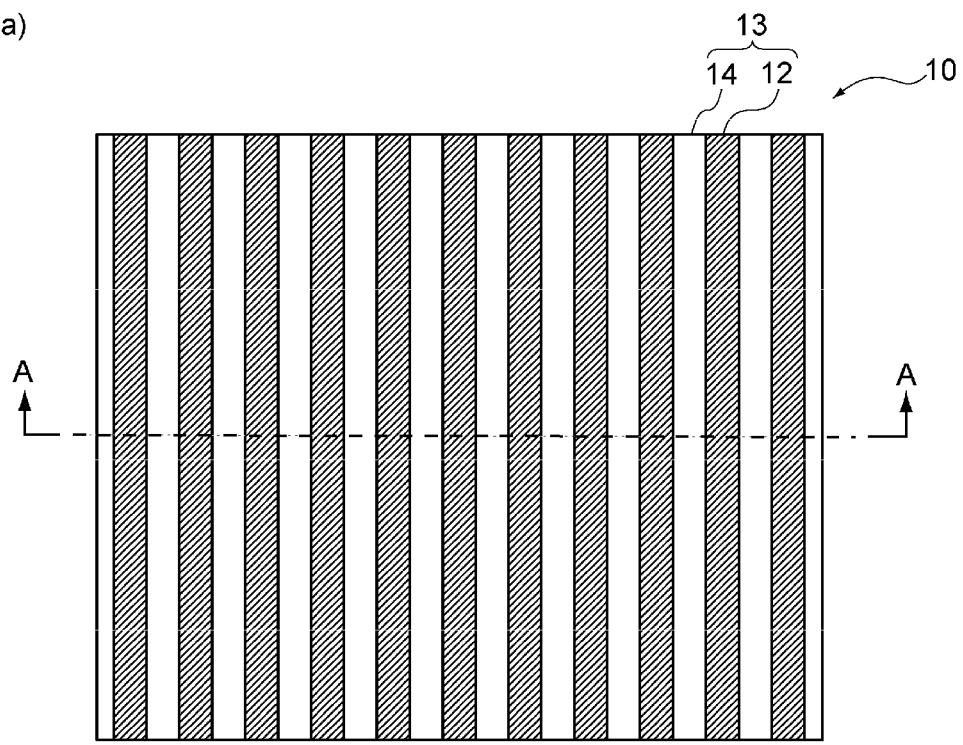
FIGS. 1(a) and 1(b) are diagrams provided to illustrate the outline of the louver structure in a light diffusion film.
Figure 1B:
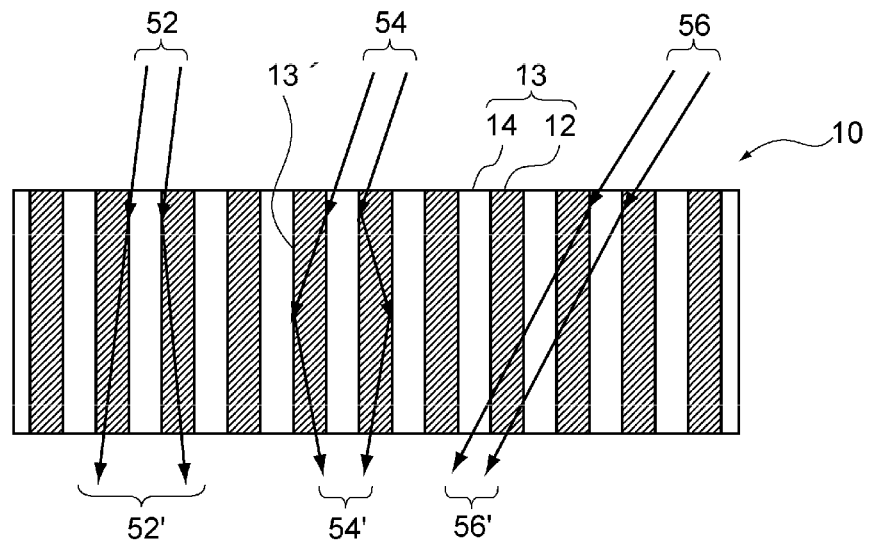

First, FIG. 1(a) shows a top view diagram (plan view) of a light diffusion film 10, and FIG. 1(b) shows a cross-sectional diagram of the light diffusion film 10 in a case in which the light diffusion film 10 shown in FIG. 1(a) is cut in a perpendicular direction along the dotted line A-A, and the cut surface is viewed from the arrow direction.

Figure 2A:
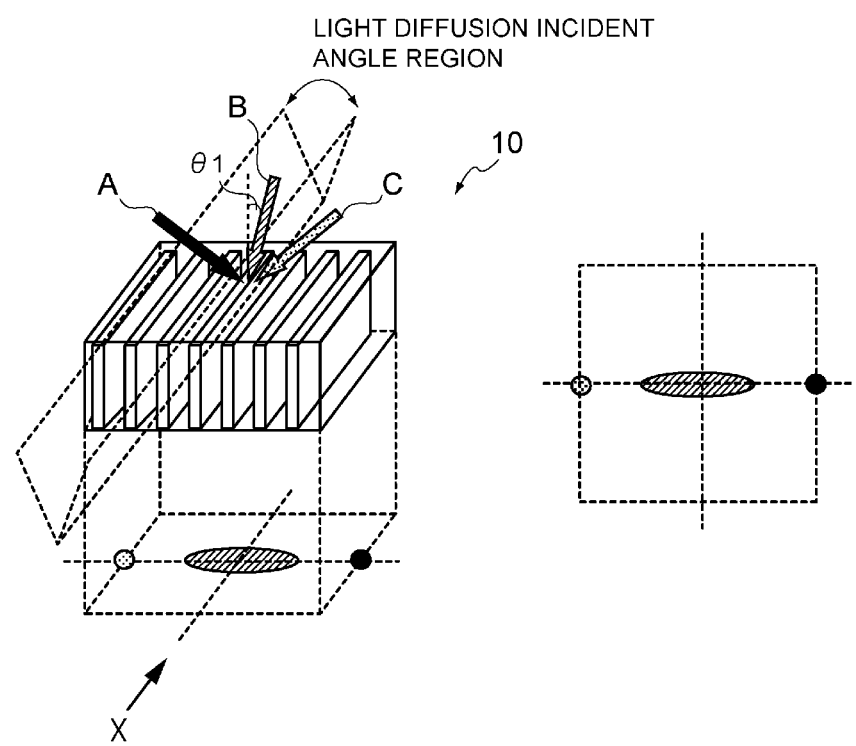
FIGS. 2(a) and 2(b) are diagrams provided to illustrate the incident angle dependency, anisotropy, and the angle of aperture in a light diffusion film.
Figure 2B:
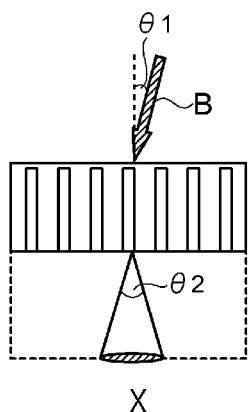

Furthermore, FIG. 2(a) shows an overall view diagram of the light diffusion film 10, and FIG. 2(b) shows a cross-sectional diagram in a case in which the light diffusion film 10 of FIG. 2(a) is viewed from the direction X.

As illustrated in such plan view of FIG. 1(a), the light diffusion film 10 includes a louver structure 13 in which plate-shaped regions 12 having a relatively higher refractive index and plate-shaped regions 14 having a relatively lower refractive index are alternately arranged in parallel along any one direction along the film plane.

Furthermore, as illustrated in the cross-sectional diagram of FIG. 1(b), the high refractive index plate-shaped regions 12 and the low refractive index plate-shaped regions 14 respectively have a predetermined thickness, and thus, they maintain the state of being alternately arranged in parallel even in the perpendicular direction of the light diffusion film 10.

It is speculated that as a result, as illustrated in FIG. 2(a), when the incident angle falls in the light diffusion incident angle region, incident light is diffused by the light diffusion film 10.

That is, as illustrated in FIG. 1(b), it is speculated that when the incident angle of light incident to the light diffusion film 10 has a value in a predetermined range of angles from parallel with respect to the boundary surface 13' of the louver structure 13, that is, a value in the light diffusion incident angle region, the incident light (52, 54) passes through the interior of the high refractive index plate-shaped regions 12 in the louver structure along the film thickness direction while changing the direction, and thereby the direction of travel of light at the light emitting surface side is not kept constant.

As a result, it is speculated that when the incident angle is within the light diffusion incident angle region, the incident light is diffused by the light diffusion film 10 (52', 54').

On the other hand, when the incident angle of light incident to the light diffusion film 10 does not fall in the light diffusion incident angle region, as illustrated in FIG. 1(b), it is speculated that the incident light 56 is directly transmitted through the light diffusion film 10 without being diffused by the light diffusion film (56').

Based on the fundamental principle described above, the light diffusion film 10 having the louver structure 13 can exhibit, for example, incident angle dependency in connection with transmission and diffusion of light as illustrated in FIG. 2(a).

Furthermore, as illustrated in FIG. 2(a), the light diffusion film is such that when the incident angle of incident light is included in the light diffusion incident angle region, even if the incident angles are different, almost similar light diffusion can be induced at the light emitting surface side.

Therefore, it can be said that the light diffusion film thus obtained also has a light collecting action of concentrating light to a predetermined site.

Meanwhile, the light diffusion incident angle region is, as illustrated in FIG. 2(a), an angle region that is determined for each light diffusion film by the difference in the refractive index, the inclination angle or the like of the louver structures in the light diffusion film.

Furthermore, regarding the change in the direction of incident light in the high refractive index region 12 within the louver structure, the case of the direction being of gradient index type in which the direction changes in a curve can be considered, in addition to the case of the direction being of step index type in which the direction changes zigzag in a straight line by the total reflection illustrated in FIG. 1(b).

Furthermore, it is preferable that the light diffusion film obtainable by the present invention have anisotropy (hereinafter, may be referred to as "anisotropic light diffusion film").

Here, the term "anisotropy" means that, as illustrated in FIG. 2(a), when light is diffused by the film, the diffusion state of light for the emitted light that has been diffused in a plane parallel to the film (shape of spread of the diffused light) has different properties depending on the direction within the same plane.

More specifically, as illustrated in FIG. 2(a), among the components included in the incident light, for the component that is perpendicular to the direction of the louver structure extended along any one direction along the film plane, diffusion of light occurs selectively; however, among the components included in the incident light, for the component that is parallel to the direction of the louver structure extended along any one direction along the film plane, diffusion of light does not easily occur. Therefore, anisotropic light diffusion is realized.

Therefore, the shape of expansion of the diffused light in a light diffusion film having anisotropy is an approximately elliptical shape as illustrated in FIG. 2(a).

Also, as described above, since the component of incident light that contributes to anisotropic light diffusion is mainly a component that is perpendicular to the direction of the louver structure extended along any one direction along the film plane, as illustrated in FIG. 2(b), according to the present invention, the expression "incident angle $\theta 1$" of the incident light is intended to mean the incident angle of the component that is perpendicular to the direction of the louver structure extended along any one direction along the film surface. Furthermore, at this time, the incident angle $\theta 1$ is intended to mean the angle (°) in a case in which the angle of the surface on the incidence side of the light diffusion film with respect to the normal line is designated as 0°.

Furthermore, according to the present invention, the "angle of aperture of diffused light" is the width of the light diffusion angle region, and as illustrated in FIG. 2(b), the "angle of aperture of diffused light" means the angle of aperture $\theta 2$ of diffused light with respect to the incident light at a predetermined incident angle $\theta 1$ in a case in which the cross-section of the film is viewed from the direction X that is parallel to the direction of the louver structure extended along any one direction along the film plane.

2. Fundamental Configuration

Next, the fundamental configuration of the light diffusion film obtainable by the production method of the present invention will be explained using the drawings.

Figure 3A:
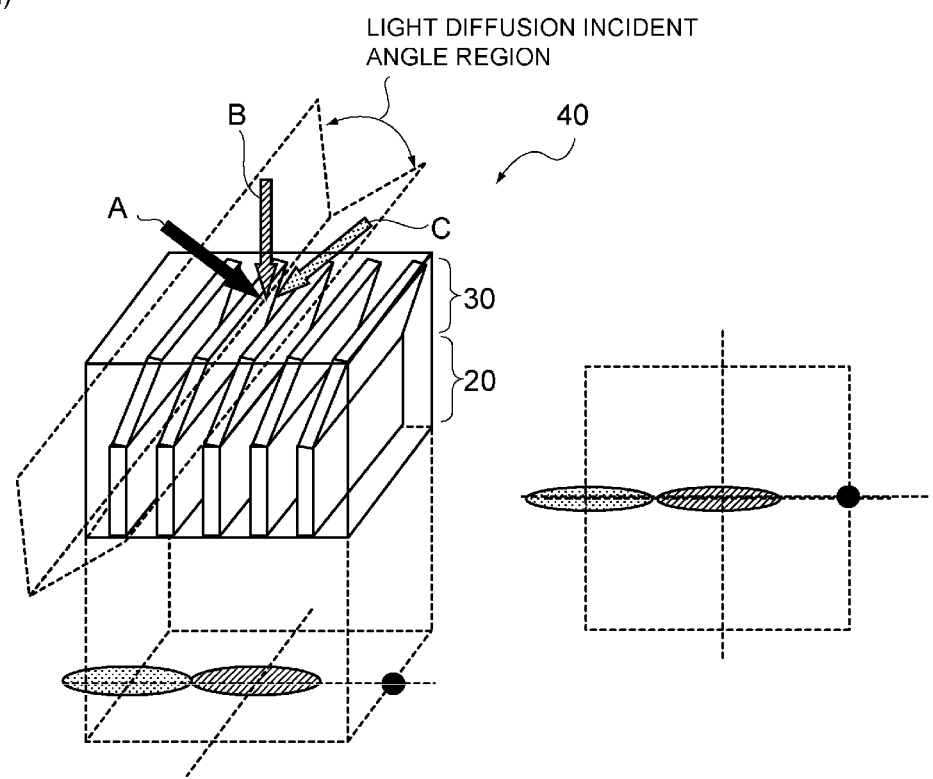
FIGS. 3(a) and 3(b) are other diagrams provided to illustrate the incident angle dependency, anisotropy, and the angle of aperture in a light diffusion film.
Figure 3B:
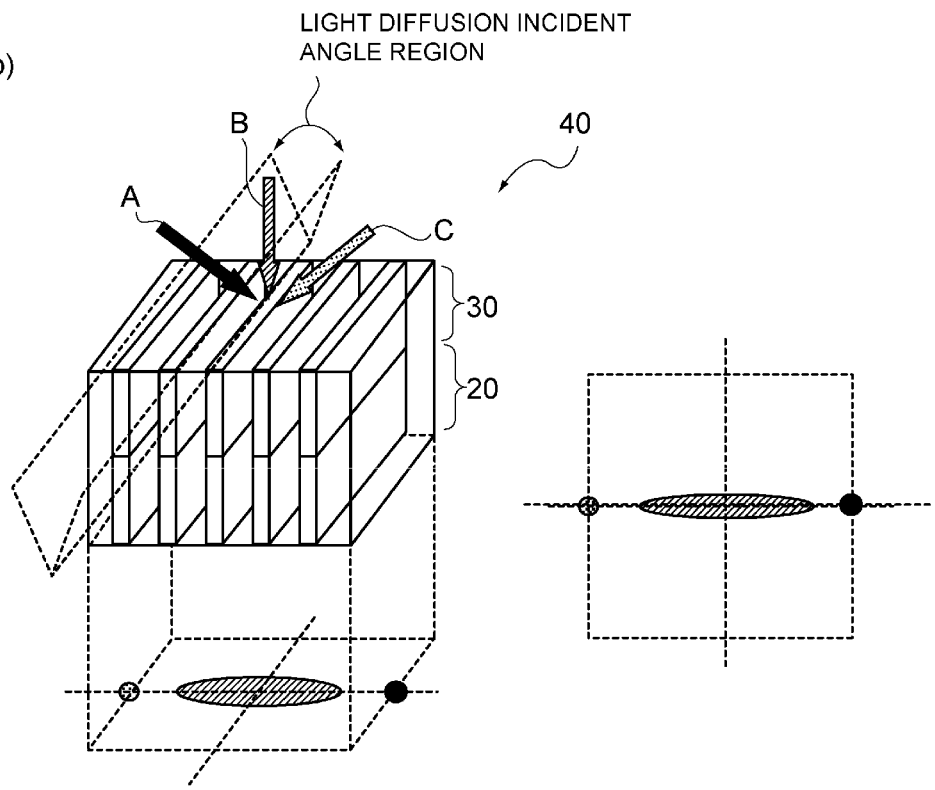

As illustrated in FIGS. 3(a) and 3(b), a light diffusion film 40 obtainable by the production method of the present invention is characterized by having a first louver structure region 20 and a second louver structure region 30 in sequence from the lower part along the film thickness direction.

Therefore, when the light diffusion film obtainable by the production method of the present invention is used, for example, as illustrated in FIG. 3(a), by varying the incident angle dependency exhibited by the respective louver structure regions, uniformity of the intensity of diffused light in the light diffusion angle region can be enhanced, and also, the light diffusion incident angle region can be expanded effectively.

On the other hand, as illustrated in FIG. 3(b), when the light diffusion angle regions of the respective louver structure regions are overlapped, although the contribution of the light diffusion angle region to expansion is small, since the length of louvers as a whole in the film thickness direction is stably extended, uniformity of the intensity of diffused light in the light diffusion angle region can be enhanced effectively.

Meanwhile, the "lower part" described above means the side closer to the process sheet in the film thickness direction of the coating layer. Therefore, the lower part is a term used for the convenience of explaining the present invention, and is not intended to restrict the up and down directions of the light diffusion film itself.

Furthermore, the method for producing a light diffusion film of the present invention is characterized in that a coating layer formed from a composition for light diffusion film is subjected to first active energy ray irradiation, and a first louver structure region is formed in the lower part of the coating layer, while a louver structure-unformed region is left in the upper part of the coating layer.

The method is characterized in that subsequently the coating layer is subjected to second active energy ray irradiation, and a second louver structure region is formed in the louver structure-unformed region.

Figure 4A:
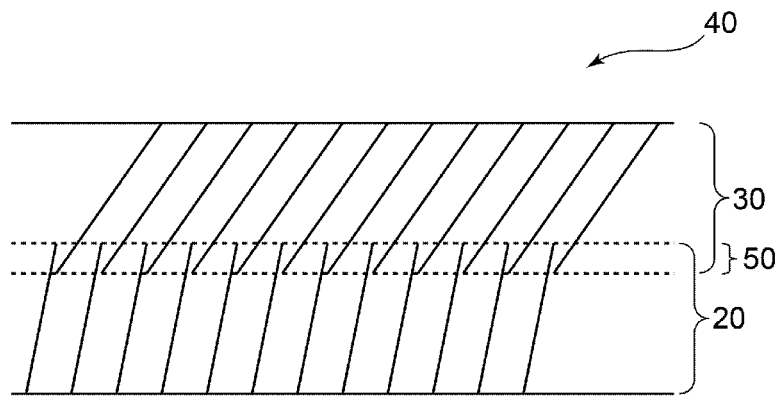
FIGS. 4(a) to 4(c) are diagrams provided to illustrate embodiments of light diffusion films.
Figure 4B:
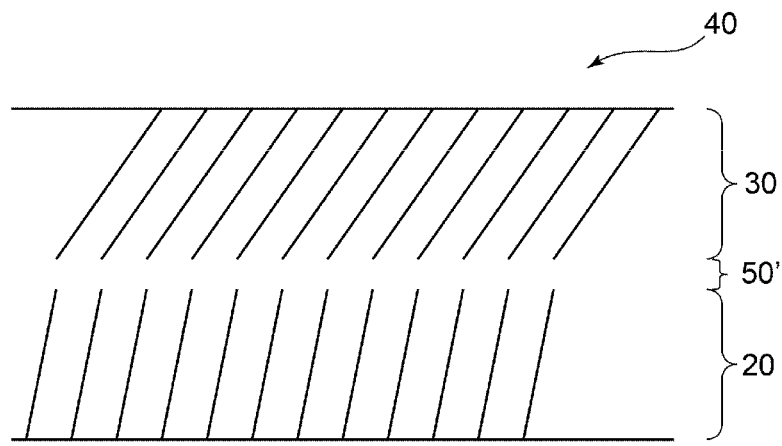

Therefore, the light diffusion film obtainable by the production method of the present invention can adopt the embodiments illustrated in FIGS. 4(a) to 4(b).

That is, according to a first embodiment, as illustrated in FIG. 4(a), there is provided a light diffusion film 40 having an overlapping louver structure region 50 in which the upper end of the first louver structure region 20 and the lower end of the second louver structure region 30 overlap each other.

Furthermore, according to a second embodiment, as illustrated in FIG. 4(b), there is provided a light diffusion film 40 in which a gap section 50' having no louver structure formed therein exists at the interface between the first louver structure region 20 and the second louver structure region 30, or the first louver structure region 20 and the second louver structure region 30 are barely in contact.

Figure 4C:
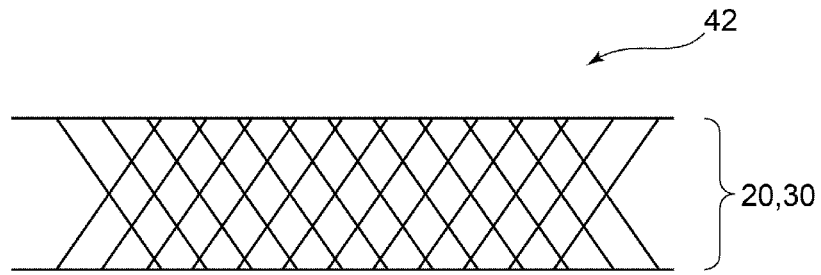

On the other hand, as illustrated in FIG. 4(c), light diffusion film 42 in which two louver structure regions (20 and 30) present inside the film are excessively overlapping each other, may not be obtained by the production method of the present invention that is characterized by performing active energy ray irradiation in two stages.

3. Step (a): Step for Preparing Composition for Light Diffusion Film

Step (a) is a step of preparing a composition for light diffusion film.

More specifically, it is preferable to stir two polymerizable compounds having different refractive indices under high temperature conditions at 40° C. to 80° C. to obtain a uniform mixed liquid.

Furthermore, at the same time, it is preferable to obtain a solution of a composition for light diffusion film by adding additives such as a photopolymerization initiator to the mixed liquid if desired, and then further adding a diluent solvent as necessary to attain a desired viscosity, while stirring the mixed liquid to become uniform.

Step (a) will be described more specifically in the following.

(1) High Refractive Index Polymerizable Compound (1)-1 Kind

Between the two polymerizable compounds having different refractive indices, the kind of the polymerizable compound having a higher refractive index (hereinafter, may be referred to as component (A)) is not particularly limited, but it is preferable to use a (meth)acrylic acid ester containing plural aromatic rings as a main component of the polymerizable compound.

The reason for this is speculated to be that when a particular (meth)acrylic acid ester is incorporated as the component (A), the polymerization rate of the component (A) can be made faster than the polymerization rate of the polymerizable compound having a lower refractive index (hereinafter, may be referred to as component (B)), so as to induce a predetermined difference between the polymerization rates of these components, and thus copolymerizability of the two components can be effectively decreased.

As a result, when the composition is photocured, a so-called louver structure in which plate-shaped regions originating from the component (A) and plate-shaped regions originating from the component (B) are alternately extended, can be formed efficiently.

Furthermore, it is speculated that when a particular (meth) acrylic acid ester is incorporated as the component (A), sufficient compatibility with the component (B) is obtained when the component (A) is in the stage of a monomer, but in the stage that plural molecules are linked in the course of polymerization, the compatibility between the component (A) and the component (B) can be decreased to a predetermined extent, and the louver structure can be formed more efficiently.

Furthermore, when a particular (meth)acrylic acid ester is incorporated as the component (A), the refractive index of the plate-shaped regions originating from the component (A) in the louver structure can be increased, and the difference thereof with the refractive index of the plate-shaped regions originating from the component (B) can be adjusted to a value greater than or equal to a predetermined value.

Therefore, by incorporating a particular (meth)acrylic acid ester as the component (A), together with the characteristics of the component (B) that will be described below, a light diffusion film including a first louver structure and a second louver structure region, in which plate-shaped regions having different refractive indices are alternately extended, can be obtained efficiently.

Meanwhile, the term "(meth)acrylic acid ester containing plural aromatic rings" means a compound having plural aromatic rings in the ester residue moiety of the (meth) acrylic acid ester.

Furthermore, "(meth)acrylic acid" means both acrylic acid and methacrylic acid.

Furthermore, examples of a (meth)acrylic acid ester containing plural aromatic compounds as such a component (A) include biphenyl (meth)acrylate, naphthyl (meth)acrylate, anthracyl (meth)acrylate, benzylphenyl (meth)acrylate, biphenyloxyalkyl (meth)acrylate, naphthyloxyalkyl (meth) acrylate, anthracyloxyalkyl (meth)acrylate, benzylphenyloxyalkyl (meth)acrylate, and compounds in which some of hydrogen atoms on the aromatic ring have been substituted by halogen, alkyl, alkoxy, halogenated alkyl, or the like.

Furthermore, as the (meth)acrylic acid ester containing plural aromatic rings as the component (A), it is preferable for the composition for light diffusion film to contain a compound containing a biphenyl ring, and it is particularly preferable for the composition to contain a biphenyl compound represented by the following formula (1):

[Chemical Formula 2]

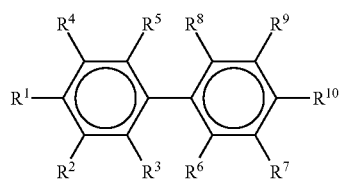

(1)

wherein in formula (1), $R^1$ to $R^{10}$ are respectively independent of one another; at least one of $R^1$ to $R^{10}$ represents a substituent represented by the following formula (2); and the others each represent any one substituent selected from a hydrogen atom, a hydroxyl group, a carboxyl group, an alkyl group, an alkoxy group, a halogenated alkyl group, a hydroxyalkyl group, a carboxyalkyl group, and a halogen atom.

[Chemical Formula 3]

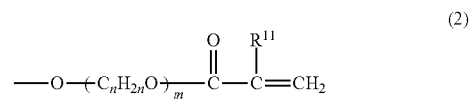

(2)

wherein in formula (2), $R^{11}$ represents a hydrogen atom or a methyl group; the number of carbon atoms n represents an integer from 1 to 4; and the number of repetitions an represents an integer from 1 to 10.

The reason for this is speculated to be that when a biphenyl compound having a particular structure is incorporated as the component (A), a predetermined difference between the polymerization rates of the component (A) and the component (B) is induced, and the compatibility between the component (A) and the component (B) can be decreased to a predetermined extent, so that copolymerizability between the two components can be decreased.

Furthermore, the refractive index of the plate-shaped regions originating from the component (A) in the first louver structure region and the second louver structure region can be increased, and thereby the difference between the refractive index of the plate-shaped regions originating from the component (A) and the refractive index of the plate-shaped regions originating from the component (B) can be more easily adjusted to a value greater than or equal to a predetermined value.

Furthermore, when $R^1$ to $R^{10}$ in the formula (1) includes any one of an alkyl group, an alkoxy group, a halogenated alkyl group, a hydroxyalkyl group and a carboxyalkyl group, it is preferable to adjust the number of carbon atoms of the alkyl moiety to a value in the range of 1 to 4.

The reason for this is that if such number of carbon atoms has a value of above 4, the polymerization rate of the component (A) may decrease, or the refractive index of the plate-shaped regions originating from the component (A) becomes too low, and it may be difficult to form the first louver structure region and the second louver structure region efficiently.

Therefore, when $R^1$ to $R^{10}$ in the formula (1) includes any one of an alkyl group, an alkoxy group, a halogenated alkyl group, a hydroxyalkyl group and a carboxyalkyl group, it is more preferable to adjust the number of carbon atoms of the alkyl moiety to a value in the range of 1 to 3, and even more preferably to a value in the range of 1 to 2.

Furthermore, it is preferable that $R^1$ to $R^{10}$ in the formula (1) each represent a substituent other than a halogenated alkyl group or a halogen atom, that is, a substituent that does not contain halogen.

The reason for this is that generation of dioxin is prevented when the light diffusion film is incinerated or the like, and therefore, it is preferable from the viewpoint of environment protection.

Meanwhile, in regard to conventional light diffusion films having a louver structure, on the occasion of obtaining a predetermined louver structure, it has been general to the monomer components to halogen substitution for the purpose of increasing the refractive indices of the monomer components.

From this viewpoint, when a biphenyl compound represented by formula (1) is used, even if halogen substitution is not implemented, a high refractive index can be obtained.

Therefore, when a light diffusion film formed by photocuring the composition for light diffusion film according to the present invention is used, even without a compound containing halogen, the light diffusion film can exhibit satisfactory incident angle dependency.

Furthermore, it is preferable that any one of $R^2$ to $R^9$ in the formula (1) represent a substituent represented by formula (2).

The reason for this is that when the position of the substituent represented by formula (2) is set to a position other than the position of $R^1$ and the position of $R^{10}$, the molecules of the component (A) can be effectively prevented from being aligned and crystallized in the stage before photocuring.

Furthermore, the compound is liquid in the state of monomer before being photocured, and the compound can be apparently uniformly mixed with the component (B) even if a diluent solvent or the like is not used.

It is because in the stage of photocuring, aggregation/phase separation at a fine level of the component (A) and the component (B) is enabled, and a light diffusion film having a first louver structure region and a second louver structure region can be obtained more efficiently.

Furthermore, from the same viewpoint, it is particularly preferable that any one of $R^3$, $R^5$, $R^6$ and $R^8$ in the formula (1) represent a substituent represented by formula (2).

Furthermore, it is usually preferable that the number of repetitions m for the substituent represented by formula (2) is defined as an integer from 1 to 10.

The reason for this is that if the number of repetitions m has a value of above 10, the oxyalkylene chain that links the polymerization site and the biphenyl ring becomes too long, and polymerization of the molecules of the component (A) at the polymerization site may be inhibited thereby.

Therefore, it is more preferable that the number of repetitions m for the substituent represented by formula (2) is defined as an integer from 1 to 4, and particularly preferably as an integer from 1 to 2.

Meanwhile, from the same viewpoint, it is usually preferable that the number of carbon atoms n for the substituent represented by formula (2) is defined as an integer from 1 to 4.

Furthermore, upon considering the case in which the position of a polymerizable carbon-carbon double bond serving as a polymerization site is so close to the biphenyl ring that the biphenyl ring imposes steric hindrance, and the polymerization rate of the component (A) is decreased, it is more preferable that the number of carbon atoms n for the substituent represented by formula (2) is defined as an integer from 2 to 4, and particularly preferably as an integer from 2 to 3.

Furthermore, specific preferred examples of the biphenyl compound represented by formula (1) include compounds represented by the following formulas (3) and (4):

[Chemical Formula 4]

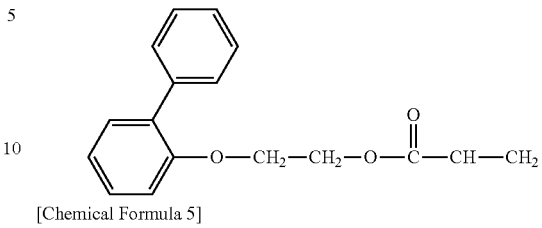

(3)

[Chemical Formula 5]

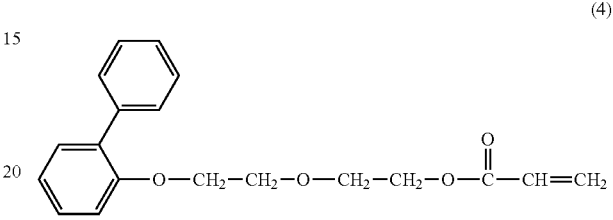

(4)

(1)-2 Molecular Weight

Furthermore, it is preferable to adjust the molecular weight of the component (A) to a value in the range of 200 to 2,500.

The reason for this is that when the molecular weight of the component (A) is adjusted to a predetermined range, the polymerization rate of the component (A) can be made faster, and copolymerizability of the component (A) and the component (B) can be decreased more effectively.

As a result, when the composition is photocured, a louver structure in which plate-shaped regions originating from the component (A) and plate-shaped regions originating from the component (B) are alternately extended, can be formed more efficiently.

That is, it is because if the molecular weight of the component (A) has a value of below 200, the polymerization rate is decreased by steric hindrance and approaches the polymerization rate of the component (B), and thus copolymerization with the component (B) is prone to occur. On the other hand, it is because if the molecular weight of the component (A) has a value of above 2,500, it is speculated that the difference between the molecular weight of the component (A) and the molecular weight of the component (B) is decreased, and also, the polymerization rate of the component (A) is decreased to approach the polymerization rate of the component (B), and copolymerization with the component (B) is prone to occur; as a result, it may be difficult to form a louver structure efficiently.

Therefore, it is more preferable to adjust the molecular weight of the component (A) to a value in the range of 240 to 1,500, and even more preferably to a value in the range of 260 to 1,000.

Meanwhile, the molecular weight of the component (A) can be determined from the calculated value obtainable from the composition of the molecule and the atomic amount of constituent atoms, or can be measured as the weight average molecular weight using gel permeation chromatography (GPC).

(1)-3 Exclusive Use

Furthermore, the composition for light diffusion film according to the present invention is characterized by including the component (A) as a monomer component that forms plate-shaped regions having a high refractive index in the first louver structure region and the second louver structure region, but it is preferable that the component (A) is included as a single component.

The reason for this is that when such a configuration is adopted, the fluctuations in the refractive index of the plate-shaped regions originating from the component (A), that is, the plate-shaped regions having a high refractive index, can be suppressed effectively, and thereby a light diffusion film including a first louver structure region and a second louver structure region can be obtained more efficiently.

That is, when the compatibility of the component (A) with the component (B) is low, for example, when the component (A) is a halogen-based compound or the like, there are occasions in which another component (A) (for example, a non-halogen-based compound) is used in combination as a third component for compatibilizing the component (A) with the component (B).

However, in this case, the refractive index in the plate-shaped regions with a high refractive index, originating from the component (A), may fluctuate or may become prone to decrease, due to the influence of such a third component.

As a result, the difference in the refractive index with the plate-shaped regions having a low refractive index, originating from the component (B), may become non-uniform, or may be prone to decrease excessively.

Therefore, it is preferable to select a high refractive index monomer component having compatibility with the component (B), and use that monomer component as a single component (A).

In addition, for example, since a biphenyl compound represented by formula (3) as the component (A) has a low viscosity, the biphenyl compound can be used as a single component (A) in order to have compatibility with the component (B).

(1)-4 Refractive Index

Furthermore, it is preferable to adjust the refractive index of the component (A) to a value in the range of 1.5 to 1.65.

The reason for this is that when the refractive index of the component (A) is adjusted to a value in such a range, the difference between the refractive index of the plate-shaped regions originating from the component (A) and the refractive index of the plate-shaped regions originating from the component (B) can be more easily adjusted, and a light diffusion film having a first louver structure region and a second louver structure region can be obtained more efficiently.

That is, if the refractive index of the component (A) has a value of below 1.5, the difference between the refractive index of the component (A) and the refractive index of the component (B) becomes too small, and it may be difficult to obtain an effective light diffusion angle region. On the other hand, it is because if the refractive index of the component (A) has a value of above 1.65, the difference between the refractive index of the component (A) and the refractive index of the component (B) becomes large, but it may be difficult to form even an apparent compatible state with the component (B).

Therefore, it is more preferable to adjust the refractive index of the component (A) to a value in the range of 1.52 to 1.65, and even more preferable to a value in the range of 1.56 to 1.6.

Meanwhile, the refractive index of the component (A) means the refractive index of the component (A) before being cured by photocuring.

Furthermore, the refractive index can be measured according to JIS K0062.

(1)-5 Content

Furthermore, it is preferable to adjust the content of the component (A) in the composition for light diffusion film to a value in the range of 25 parts to 400 parts by weight relative to 100 parts by weight of the component (B) that will be described below.

The reason for this is that if the content of the component (A) has a value of below 25 parts by weight, the proportion of existence of the component (A) relative to the component (B) becomes smaller, so that the width of the plate-shaped regions originating from the component (A) becomes excessively smaller compared to the width of the plate-shaped regions originating from the component (B), and it may be difficult to obtain the first louver structure region and the second louver structure region, both having satisfactory incident angle dependency. Furthermore, it is because the length of the louvers in the thickness direction of the light diffusion film becomes insufficient, and light diffusibility may not be exhibited. On the other hand, it is because if the content of the component (A) has a value of above 400 parts by weight, the proportion of existence of the component (A) relative to the component (B) becomes larger, so that the width of the plate-shaped regions originating from the component (A) becomes excessively larger compared to the width of the plate-shaped regions originating from the component (B), and it may be difficult to obtain the first louver structure region and the second louver structure region, both having satisfactory incident angle dependency. Furthermore, it is because the length of the louvers in the thickness direction of the light diffusion film becomes insufficient, and light diffusibility may not be exhibited.

Therefore, it is more preferable to adjust the content of the component (A) to a value in the range of 40 parts to 300 parts by weight, and even more preferably to a value in the range of 50 parts to 200 parts by weight, relative to 100 parts by weight of the component (B).

(2) Low Refractive Index Polymerizable Compound (2)-1 Kind

Between the two polymerizable compounds having different refractive indices, the kind of the polymerizable compound having a lower refractive index (component (B)) is not particularly limited, and examples of the main component thereof include urethane (meth)acrylate, a (meth)acrylic polymer having a (meth)acryloyl group in a side chain, a (meth)acryloyl group-containing silicone resin, and an unsaturated polyester resin. However, it is particularly preferable to use urethane (meth)acrylate as the main component.

The reason for this is that when urethane (meth)acrylate is used, the difference between the refractive index of the plate-shaped regions originating from the component (A) and the refractive index of the plate-shaped regions originating from the component (B) can be adjusted more easily, the fluctuations in the refractive index of the plate-shaped regions originating from the component (B) are effectively suppressed, and thus, a light diffusion film having a first louver structure region and a second louver structure region can be obtained more efficiently.

Therefore, in the following, urethane (meth)acrylate as the component (B) will be described mainly.

Meanwhile, (meth)acrylate means both acrylate and methacrylate.

First, urethane (meth)acrylate is formed from (a) a compound containing at least two isocyanate groups; (b) a polyol compound, preferably a diol compound, and particularly preferably polyalkylene glycol; and (c) hydroxyalkyl (meth)acrylate.

Meanwhile, the component (B) is intended to also include an oligomer having a repeating unit of urethane bond.

Among these, examples of the compound containing at least two isocyanate groups, which is the component (a), include aromatic polyisocyanates such as 2,4-tolylene diisocyanate, 2,6-tolylene diisocyanate, 1,3-xylylene diisocyanate, and 1,4-xylylene diisocyanate; aliphatic polyisocyanates such as hexamethylene diisocyanate; alicyclic polyisocyanates such as isophorone diisocyanate (IPDI) and hydrogenated diphenylmethane diisocyanate; biuret forms and isocyanurate forms thereof; and adducts that are reaction products with low molecular weight active hydrogen-containing compounds such as ethylene glycol, propylene glycol, neopentyl glycol, trimethylolpropane, and castor oil (for example, xylylene diisocyanate-based trifunctional adduct).

Furthermore, among those described above, the component (a) is particularly preferably an alicyclic polyisocyanate.

The reason for this is that alicyclic polyisocyanates are likely to provide differences in the reaction rates of the various isocyanate groups in relation to the conformation or the like, as compared with aliphatic polyisocyanates.

Thereby, the component (a) reacting with the component (b) only, or the component (a) reacting with the component (c) only can be suppressed, and the component (a) can be caused to react reliably with the component (b) and the component (c), so that generation of excess side products can be prevented.

As a result, the fluctuations in the refractive index of the plate-shaped regions originating from the component (B), that is, the low refractive index plate-shaped regions, in the first louver structure region and the second louver structure region can be suppressed effectively.

Furthermore, when an alicyclic polyisocyanate is used, compatibility between the component (B) and the component (A) thus obtained can be decreased to a predetermined extent, and the louver structures can be formed more efficiently, as compared with aromatic polyisocyanates.

Furthermore, when an alicyclic polyisocyanate is used, as compared with aromatic polyisocyanates, the refractive index of the component (B) thus obtained can be made smaller. Therefore, the difference between the refractive index of the component (B) and the refractive index of the component (A) can be made larger, so that light diffusibility is exhibited more reliably, and also, louver structures having high uniformity of diffused light in the light diffusion angle region can be formed more efficiently.

Furthermore, among such alicyclic polyisocyanates, an alicyclic diisocyanate containing only two isocyanate groups is preferred.

The reason for this is that when an alicyclic diisocyanate I used, the component (b) and the component (c) react quantitatively, and a single component (B) can be obtained.

Particularly preferred examples of such an alicyclic diisocyanate include isophorone diisocyanate (IPDI).

The reason for this is that a significant difference can be provided in the reactivity of two isocyanate groups.

Furthermore, among the components that form urethane (meth)acrylate, examples of the polyalkylene glycol as the component (b) include polyethylene glycol, polypropylene glycol, polybutylene glycol, and polyhexylene glycol, and among them, polypropylene glycol is particularly preferred.

The reason for this is that since polypropylene glycol has low viscosity, this component can be handled solventlessly.

Furthermore, it is because, with polypropylene glycol, when the component (B) is cured, the polypropylene glycol forms a satisfactory soft segment in the relevant cured product, and handleability or decorativeness of the light diffusion film can be enhanced effectively.

Meanwhile, the weight average molecular weight of the component (B) can be mainly adjusted by the weight average molecular weight of the component (b). Here, the weight average molecular weight of the component (b) is usually 2,300 to 19,500, preferably 4,300 to 14,300, and particularly preferably 6,300 to 12,300.

Furthermore, among the components that form urethane (meth)acrylate, examples of the hydroxyalkyl (meth)acrylate as the component (c) include 2-hydroxyethyl (meth)acrylate, 2-hydroxypropyl (meth)acrylate, 3-hydroxypropyl (meth)acrylate, 2-hydroxybutyl (meth)acrylate, 3-hydroxybutyl (meth)acrylate, and 4-hydroxybutyl (meth)acrylate.

Furthermore, from the viewpoint of decreasing the polymerization rate of the urethane (meth)acrylate thus obtainable, and more efficiently forming a predetermined louver structure, the component is more preferably hydroxyalkyl methacrylate, and even more preferably 2-hydroxyethyl methacrylate.

Furthermore, synthesis of the urethane (meth)acrylate based on the components (a) to (c) can be carried out by a conventional method.

In this case, it is preferable to adjust the mixing ratio of the components (a) to (c) to the ratio of component (a): component (b):component (c)=1 to 5:1:1 to 5.

The reason for this is that when such a mixing ratio is employed, a urethane (meth)acrylate in which the two hydroxyl groups carried by the component (b) react with one of the isocyanate groups respectively carried by the components (a) to be bonded thereto, and the hydroxyl groups carried by the component (c) react respectively with the other isocyanate group respectively carried by the two components (a) to be bonded, can be efficiently synthesized.

Therefore, it is more preferable to adjust the mixing ratio of the components (a) to (c) to the ratio of component (a):component (b):component (c)=1 to 3:1:1 to 3, and even more preferably to the ratio of 2:1:2.

(2)-2 Weight Average Molecular Weight

Furthermore, it is preferable to adjust the weight average molecular weight of the component (B) to a value in the range of 3,000 to 20,000.

The reason for this is that when the weight average molecular weight of the component (B) is adjusted to a predetermined range, a predetermined difference is caused between the polymerization rates of the component (A) and the component (B), and thus copolymerizability of the two components can be effectively decreased.

As a result, when photocured, a first louver structure region and a second louver structure region, in which plate-shaped regions originating from the component (A) and plate-shaped regions originating from the component (B) are alternately extended, can be formed efficiently.

That is, it is because if the weight average molecular weight of the component (B) has a value of below 3,000, the polymerization rate of the component (B) is increased and approaches closer to the polymerization rate of the component (A), so that copolymerization with the component (A) is likely to occur, and as a result, it may be difficult to form the first louver structure region and the second louver structure region efficiently. On the other hand, it is because if the weight average molecular weight of the component (B) has a value of above 20,000, it may be difficult to form the first louver structure and the second louver structure, in which plate-shaped regions originating from the component (A) and the component (B) are alternately extended, or compatibility with the component (A) may be decreased excessively, and the component (A) may precipitate in the stage of application.

Therefore, it is more preferable to adjust the weight average molecular weight of the component (B) to a value in the range of 5,000 to 15,000, and even more preferably to a value in the range of 7,000 to 13,000.

Meanwhile, the weight average molecular weight of the component (B) can be measured using gel permeation chromatography (GPC).

(2)-3 Exclusive Use

Furthermore, regarding the component (B), two or more kinds having different molecular structures or different weight average molecular weights may be used in combination, but from the viewpoint of suppressing fluctuations in the refractive index of the plate-shaped regions originating from the component (B) in the first louver structure region and the second louver structure region, it is preferable to use only one kind.

That is, it is because when plural compounds are used for the component (B), the refractive index for the low refractive index plate-shaped regions originating from the component (B) may fluctuate or increase, and the difference between the refractive index of the low refractive index plate-shaped regions originating from the component (B) and the refractive index of the high refractive index plate-shaped regions originating from the component (A) may become non-uniform or excessively decrease.

(2)-4 Refractive Index

Furthermore, it is preferable to adjust the refractive index of the component (B) to a value in the range of 1.4 to 1.55.

The reason for this is that when the refractive index of the component (B) is adjusted to a value in such a range, the difference between the refractive indices of the plate-shaped regions originating from the component (A) and the plate-shaped regions originating from the component (B) can be easily adjusted, and a light diffusion film having a first louver structure region and a second louver structure region can be obtained more efficiently.

That is, it is because if the refractive index of the component (B) has a value of below 1.4, the difference between the refractive index of the component (B) and the refractive index of the component (A) becomes larger, but compatibility with the component (A) is extremely deteriorated, and there is a risk that the first louver structure region and the second louver structure region may not be formed. On the other hand, it is because if the refractive index of the component (B) has a value of above 1.55, the difference between the refractive index of the component (B) and the refractive index of the component (A) becomes too small, and it may be difficult to obtain desired incident angle dependency.

Therefore, it is more preferable to adjust the refractive index of the component (B) to a value in the range of 1.45 to 1.54, and even more preferably to a value in the range of 1.46 to 1.52.

Meanwhile, the refractive index of the component (B) described above means the refractive index of the component (B) before being cured by light irradiation.

The refractive index can be measured, for example, according to JIS K0062.

Furthermore, it is preferable to adjust the difference between the refractive index of the component (A) and the refractive index of the component (B) to a value of 0.01 or more.

The reason for this is that when such difference in the refractive index is adjusted to a value in a predetermined range, a light diffusion film having more satisfactory incident angle dependency in connection with transmission and diffusion of light, and having a broader light diffusion incident angle region, can be obtained.

That is, it is because such difference in the refractive index has a value of below 0.01, the range of angle at which incident light undergoes total reflection in the first louver structure region and the second louver structure region is narrowed, the angle of aperture in light diffusion may become excessively narrow. On the other hand, it is because if such difference in the refractive index has an excessively large value, compatibility between the component (A) and the component (B) are deteriorated so much, and there is a risk that the first louver structure region and the second louver structure region may not be formed.

Therefore, it is more preferable to adjust the difference between the refractive index of the component (A) and the refractive index of the component (B) to a value in the range of 0.05 to 0.5, and even more preferably to a value in the range of 0.1 to 0.2.

Meanwhile, the refractive indices of the component (A) and the component (B) mean the refractive indices of the component (A) and the component (B) before being cured by light irradiation.

(2)-5 Content

Furthermore, it is preferable to adjust the content of the component (B) in the composition for light diffusion film to a value in the range of 10% to 80% by weight relative to 100% by weight of the total amount of the composition for light diffusion film.

The reason for this is that if the content of the component (B) has a value of below 10% by weight, the proportion of existence of the component (B) relative to the component (A) becomes smaller, the width of the plate-shaped regions originating from the component (B) becomes excessively smaller compared to the width of the plate-shaped regions originating from the component (A), and it may be difficult to obtain a first louver structure region and a second louver structure region having satisfactory incident angle dependency. Furthermore, it is because the length of the louvers in the thickness direction of the light diffusion film may be insufficient. On the other hand, it is because if the content of the component (B) has a value of above 80% by weight, the proportion of existence of the component (B) relative to the component (A) becomes larger, the width of the plate-shaped regions originating from the component (B) becomes excessively larger compared to the width of the plate-shaped regions originating from the component (A), and it may be difficult to obtain a first louver structure region and a second louver structure region having satisfactory incident angle dependency. Furthermore, it is because the length of the louvers in the thickness direction of the light diffusion film may be insufficient.

Therefore, it is more preferable to adjust the content of the component (B) to a value in the range of 20% to 70% by weight, and even more preferably to a value in the range of 30% to 60% by weight, relative to 100% by weight of the total amount of the composition for light diffusion film.

(3) Photopolymerization Initiator

Furthermore, in regard to the composition for light diffusion film according to the present invention, it is preferable, if desired, to incorporate a photopolymerization initiator as a component (C).

The reason for this is that by incorporating a photopolymerization initiator, when active energy radiation is irradiated to the composition for light diffusion film, the first louver structure region and the second louver structure region can be formed efficiently.

Here, a photopolymerization initiator refers to a compound which generates a radical species when irradiated with active energy radiation such as ultraviolet radiation.

Examples of such a photopolymerization initiator include benzoin, benzoin methyl ether, benzoin ethyl ether, benzoin isopropyl ether, benzoin n-butyl ether, benzoin isobutyl ether, acetophenone, dimethylaminoacetophenone, 2,2-dimethoxy-2-phenylacetophenone, 2,2-diethoxy-2-phenylacetophenone, 2-hydroxy-2-methyl-1-phenylpropan-1-one, 1-hydroxycyclohexyl phenyl ketone, 2-methyl-1-[4-(methylthio)phenyl]-2-morpholinopropan-1-one, 4-(2-hydroxyethoxy)phenyl 2-(hydroxy-2-propyl) ketone, benzophenone, p-phenylbenzophenone, 4,4-diethylaminobenzophenone, dichlorobenzophenone, 2-methylanthraquinone, 2-ethylanthraquinone, 2-tertiary-butylanthraquinone, 2-aminoanthraquinone, 2-methylthioxanthone, 2-ethylthioxanthone, 2-chlorothioxanthone, 2,4-dimethylthioxanthone, 2,4-diethylthioxanthone, benzyl dimethyl ketal, acetophenone dimethyl ketal, p-dimethylamine benzoic acid ester, and oligo[2-hydroxy-2-methyl-1-[4-(1-methylvinyl)phenyl]propane. Among these, one kind may be used alone, or two or more kinds may be used in combination.

Meanwhile, when a photopolymerization initiator is incorporated, it is preferable to adjust the content of photopolymerization initiator to a value in the range of 0.2 parts to 20 parts by weight, more preferably to a value in the range of 0.5 parts to 15 parts by weight, and even more preferably to a value in the range of 1 part to 10 parts by weight, relative to 100 parts by weight of the total amount of the component (A) and the component (B).

(4) Other Additives

Furthermore, additives other than the compounds described above can be appropriately added to the extent that the effect of the present invention is not impaired.

Examples of such additives include an oxidation inhibitor, an ultraviolet absorber, an antistatic agent, a polymerization accelerator, a polymerization inhibitor, an infrared absorber, a plasticizer, a diluent solvent, and a leveling agent.

Meanwhile, it is generally preferable to adjust the content of such additives to a value in the range of 0.01 parts to 5 parts by weight, more preferable to a value in the range of 0.02 parts to 3 parts by weight, and even more preferably to a value in the range of 0.05 parts to 2 parts by weight, relative to 100 parts by weight of the total amount of the component (A) and the component (B).

4. Step (b): Application Step

Figure 5A:
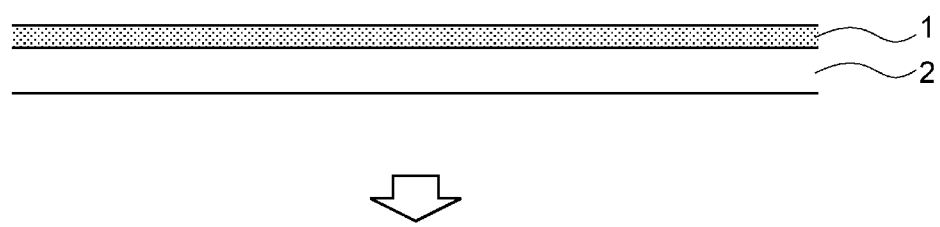
FIGS. 5(a) and (b) are diagrams provided to illustrate the first and second active energy ray irradiation processes.

Step (b) is, as illustrated in FIG. 5(a), a step of applying a prepared composition for light diffusion film on a process sheet 2, and forming a coating layer 1.

Regarding the process sheet, a plastic film and paper can all be used.

Among these, examples of the plastic film include polyester-based films such as a polyethylene terephthalate film; polyolefin-based films such as a polyethylene film and a polypropylene film; cellulose-based films such as a triacetyl cellulose film; and polyimide-based films.

Furthermore, examples of paper include glassine paper, coated paper, and laminate paper.

Also, upon considering the processes that will be described below, the process sheet 2 is preferably a film having excellent dimensional stability against heat or active energy radiation.

Preferred examples of such film include, among those described above, a polyester-based film, a polyolefin-based film, and a polyimide-based film.

Furthermore, in regard to the process sheet, it is preferable to provide a release layer on the side of the surface coated with the composition for light diffusion film in the process sheet, in order to facilitate peeling of the light diffusion film obtained after photocuring from the process sheet.

Such a release layer can be formed using a conventionally known release agent such as a silicone-based release agent, a fluorine-based release agent, an alkyd-based release agent, or an olefin-based release agent.

Meanwhile, usually, the thickness of the process sheet is preferably adjusted to a value in the range of 25 n to 200 μm.

Furthermore, the method of applying a composition for light diffusion film on a process sheet can be carried out by, for example, a conventionally known method such as a knife coating method, a roll coating method, a bar coating method, a blade coating method, a die coating method, or a gravure coating method.

Meanwhile, in this case, it is preferable to adjust the thickness of the coating layer to a value in the range of 100 μm to 700 μm.

5. Step (c): First Active Energy Ray Irradiation Step

Step (c) is a step of subjecting the coating layer to first active energy ray irradiation in an oxygen-containing atmosphere (preferably, in an air atmosphere), and forming a first louver structure region in the lower part of the coating layer, while leaving a louver structure-unformed region in the upper part of the coating layer.

Figure 5B:
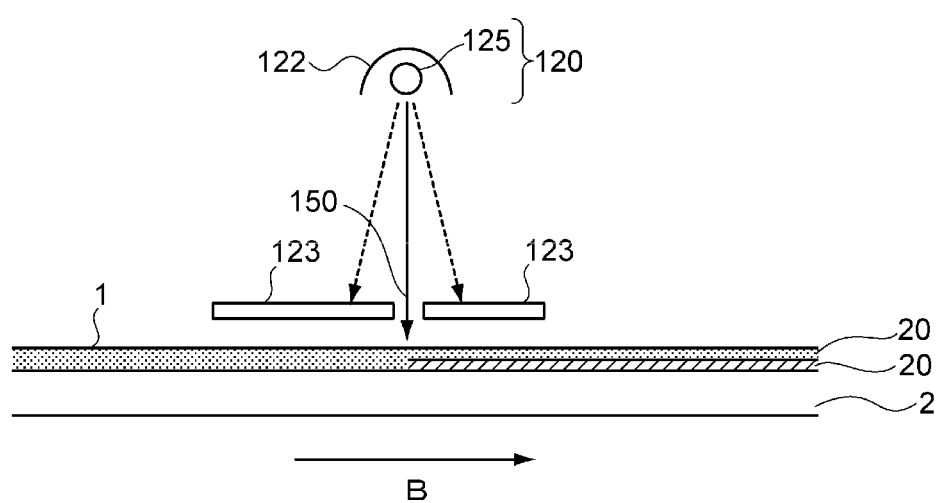

That is, as illustrated in FIG. 5(b), it is preferable to irradiate active energy ray 150 linearly to the upper surface of the coating layer 1 formed on the process sheet 2.

Figure 6A:
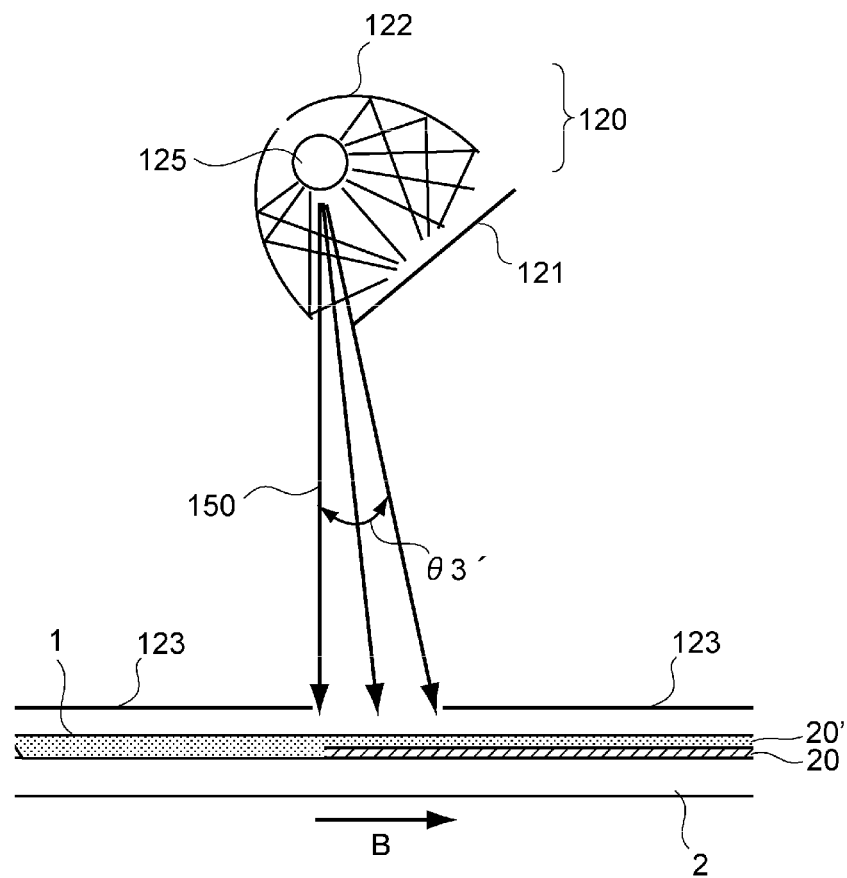
FIGS. 6(a) and 6(b) are other diagrams provided to illustrate first and second active energy ray irradiation processes.

More specifically, for example, as illustrated in FIG. 6(a), by disposing a heat ray cut-off filter 121 and a light blocking plate 123 in an ultraviolet irradiation apparatus 120 (for example, if a commercially available product is to be used, ECS-4011GX manufactured by Eye Graphics Co., Ltd.) in which a cold mirror 122 for light collection is provided is provided on a linear ultraviolet lamp 125, active energy radiation 150 composed only of direct light and having a controlled irradiation angle is extracted and irradiated to the coating layer 1 formed on the process sheet 2.

Meanwhile, the linear ultraviolet lamp is installed, with respect to a direction perpendicular to the longitudinal direction of the process sheet 2 having the coating layer 1 as reference (0°), usually at an angle having a value in the range of −80° to 80°, preferably a value in the range of −50° to 50°, and particularly preferably a value in the range of −30° to 30°.

Here, the reason for using a linear light source is that a first louver structure region that is formed by arranging plate-shaped regions having different refractive indices alternately as well as in parallel at a constant inclination angle with respect to the film thickness direction, can be formed efficiently and stably.

More specifically, by using a linear light source, light that is substantially parallel when viewed from the axial direction of the linear light source, and is non-parallel when viewed from a direction perpendicular to the axial direction of the linear light source, can be irradiated.

Figure 6B:
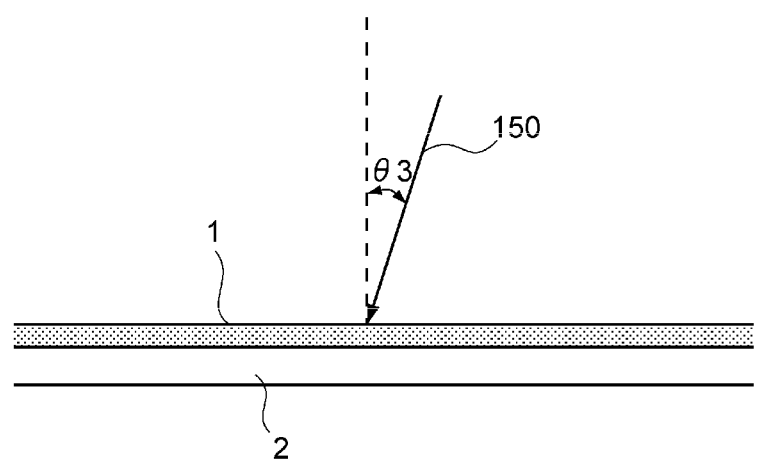

This time, regarding the irradiation angle of the irradiated light, as illustrated in FIG. 6(b), it is usually preferable to adjust the irradiation angle θ3 obtainable when the angle of the surface of the coating layer 1 with respect to the normal line is defined as 0°, to a value in the range of −80° to 80°.

The reason for this is that when the inclination angle has a value that does not fall in the range of −80° to 80°, the influence of reflection or the like at the surface of the coating layer 1 becomes larger, and it may be difficult to form a sufficient louver structure.

Furthermore, the irradiation angle θ3 preferably has a width (irradiation angle width) θ3' of 1° to 80°.

The reason for this is that if such an irradiation angle width θ3' has a value of below 1°, the spacing of the louver structure becomes too narrow, and it may be difficult to obtain a desired first louver structure region. On the other hand, it is because if such an irradiation angle width θ3' has a value of above 80°, the irradiated light is dispersed excessively, and it may be difficult to form a louver structure.

Therefore, it is more preferable to adjust the irradiation angle width θ3' of the irradiation angle θ3 to a value in the range of 2° to 45°, and even more preferably to a value in the range of 5° to 20°.

Furthermore, examples of the light to be irradiated include ultraviolet radiation and an electron beam, but it is preferable to use ultraviolet radiation.

The reason for this is that in the case of an electron beam, since the polymerization rate is very fast, the component (A) and the component (B) may not undergo phase separation sufficiently during the course of polymerization, and it may be difficult to form a louver structure. On the other hand, it is because when compared with visible light or the like, ultraviolet radiation can extend the range of selection of the component (A) and the component (B), since there is a rich variety of the ultraviolet-curable resin that is cured by irradiation of ultraviolet radiation, or of the photopolymerization initiator that can be used.

Furthermore, it is preferable to adjust the illuminance at the coating layer surface for the first active energy ray irradiation to a value in the range of 0.1 mW/cm² to 3 mW/cm².

The reason for this is that when the illuminance for the first active energy ray irradiation is adjusted to a value in such a range, the louver structure-unformed region can be left more stably, while having the first louver structure region formed efficiently.

That is, it is because if such illuminance has a value of below 0.1 mW/cm², the louver structure-unformed region can be secured sufficiently, but it may be difficult to form the first louver structure region definitely. On the other hand, it is because if such illuminance has a value of above 3 mW/cm², even if the louver structure-unformed region is present, it is speculated that the curing reaction in the relevant region over-proceeds, so that in the second active energy ray irradiation step that will be described below, it may be difficult to form the second louver structure region satisfactorily.

Therefore, it is more preferable to adjust the illuminance at the coating layer surface for the first active energy ray irradiation to a value in the range of 0.3 mW/cm² to 2 mW/cm², and even more preferably to a value in the range of 0.5 mW/cm² to 1.5 mW/cm².

Furthermore, it is preferable to adjust the amount of light at the coating layer surface for the first active energy ray irradiation to a value in the range of 5 mJ/cm² to 100 mJ/cm².

The reason for this is that when the amount of light for the first active energy ray irradiation is adjusted to a value in such a range, the louver structure-unformed region may be left more stably, while having the first louver structure region formed efficiently.

That is, it is because if such an amount of light has a value of below 5 mJ/cm², it may be difficult to extend the first louver structure region sufficient from the upper section toward the lower section, or the first louver structure region may be deformed when the second louver structure region is formed. On the other hand, it is because when such an amount of light has a value of above 100 mJ/cm², curing of the louver structure-unformed region over-proceeds, and it may be difficult to form the second louver structure region satisfactorily in the second active energy ray irradiation step that will be described below.

Therefore, it is more preferable to adjust the amount of light at the coating layer surface for the first active energy ray irradiation to a value in the range of 7 mJ/cm² to 50 mJ/cm², and even more preferable to a value in the range of 10 mJ/cm² to 30 mJ/cm².

Furthermore, it is preferable to move the coating layer formed on a process sheet at a rate of 0.1 m/min to 10 m/min to thereby pass the area to be irradiated with ultraviolet radiation by an ultraviolet radiation apparatus.

The reason for this is that if such a rate has a value of below 0.1 m/min, mass productivity may be decreased excessively. On the other hand, it is because if such a rate has a value of above 10 m/min, the moving may occur faster than curing of the coating layer, in other words, faster than the formation of a louver structure, and the incident angle of ultraviolet radiation to the coating layer may be changed, so that formation of a louver structure may proceed insufficiently.

Therefore, it is more preferable to pass the area to be irradiated with ultraviolet radiation by an ultraviolet irradiation apparatus by moving the coating layer formed on a process sheet at a rate in the range of 0.2 m/min to 5 m/min, and more preferably at a rate in the range of 0.5 m/min to 3 m/min.

Furthermore, the first active energy ray irradiation step is characterized by being carried out in an oxygen-containing atmosphere (preferably, in an air atmosphere), from the viewpoint of leaving the louver structure-unformed region efficiently.

The reason for this is that when first active energy ray irradiation is carried out in an oxygen-containing atmosphere, the louver structure-unformed region can be left stably in the upper part of the coating layer by utilizing the influence of oxygen inhibition, while having the first louver structure region formed efficiently in the lower part of the coating layer.

Therefore, with the second active energy ray irradiation that will be described below, the second louver structure region can be formed efficiently in such a louver structure-unformed region.

That is, it is because if the first active energy ray irradiation is carried out not in an oxygen-containing atmosphere, but in a non-oxygen atmosphere in which oxygen does not exist, the first louver structure region may be formed continuously almost to the outermost surface of the film, without leaving any structure-unformed region in the upper part of the film.

Meanwhile, the term "in an oxygen-containing atmosphere" means conditions in which the surface of the coating layer is in direct contact with a gas containing oxygen such as oxygen, and among others, the term "in an air atmosphere" means conditions in which the surface of the coating layer is in direct contact with air.

Therefore, performing the first active energy ray irradiation while having the surface of the coating layer exposed directly to air without performing a particular means such as laminating a film on the surface of the coating layer or performing nitrogen purging, corresponds to the first active energy ray irradiation "in an air atmosphere".

6. Step (d): Second Active Energy Ray Irradiation Step

Step (d) is a step of subjecting the coating layer to second active energy ray irradiation in a non-oxygen atmosphere, and forming a second louver structure region in the louver structure-unformed region.

That is, as illustrated in FIG. 5(b), it is preferable to linearly irradiate the active energy ray 150 to the surface of the coating layer 1 formed after the first active energy ray irradiation on a process sheet 2, and it is preferable to carry out the second active energy ray irradiation basically similarly to the first active energy ray irradiation step.

However, the second active energy ray irradiation step is characterized in that, unlike the first active energy ray irradiation step, active energy radiation is irradiated to the coating layer in a non-oxygen atmosphere.

The reason for this is that when the second active energy ray irradiation is carried out in a non-oxygen atmosphere, the influence of oxygen inhibition on the louver structure-unformed region obtained by the first active energy ray irradiation is suppressed, and thus the second louver structure region can be formed efficiently.

That is, it is because if the second active energy ray irradiation is carried out not in a non-oxygen atmosphere, but in an oxygen atmosphere, the second louver structure region may be formed at a very shallow position near the surface when irradiated at a high illuminance, but the difference in the refractive index required for light diffusion may not be obtained. Furthermore, it is because when active energy radiation is irradiated at a low illuminance, under the influence of oxygen inhibition, the second louver structure region may not be formed in the louver structure-unformed region.

Meanwhile, the term "in a non-oxygen atmosphere" means the conditions in which the surface of the coating layer is not brought into direct contact with an oxygen atmosphere or an atmosphere containing oxygen.

Therefore, for example, performing the second active energy ray irradiation while having a film laminated on the surface of the coating layer, or performing nitrogen purging by substituting air with nitrogen gas, corresponds to the second active energy ray irradiation in the "non-oxygen atmosphere".

Furthermore, regarding the second active energy ray irradiation in the "non-oxygen atmosphere" described above, it is particularly preferable to perform the second active energy ray irradiation while having an active energy ray transmitting sheet laminated on the surface of the coating layer.

The reason for this is that when the second active energy ray irradiation is carried out as such, the influence of oxygen inhibition can be effectively suppressed, and the second louver structure region can be formed more efficiently in the louver structure-unformed region.

That is, it is because when an active energy ray transmitting sheet is laminated on the surface of the coating layer, active energy radiation can be efficiently irradiated to the coating layer by causing the sheet to transmit the radiation, while stably preventing the surface of the coating layer from being brought into contact with oxygen.

Meanwhile, for the active energy ray transmitting sheet, any sheet capable of transmitting active energy radiation among the process sheets desdribed in relation to the step (b) (application step) can be used without any particular limitations.

Furthermore, regarding the active energy ray transmitting sheet, it is preferable that the center line average roughness of the surface that is not brought into contact with the coating layer be 2 μm or less, more preferably a value of 1 μla or less, and particularly preferably a value of 0.05 μm or less.

The reason for this is that with such a center line average roughness, the second active energy radiation being diffused by the active energy ray transmitting sheet can be effectively prevented, and the second louver structure region can be efficiently formed.

Meanwhile, the center line average roughness can be determined according to JIS B 0633.

From the same viewpoint, it is preferable that the haze value of the active energy ray transmitting sheet have a value in the range of 0% to 8%, and particularly preferably a value in the range of 0.1% to 5%.

Meanwhile, the haze value can be determined according to JIS K 7136.

Furthermore, it is preferable that the image clarity (slit width: sum of the values for 0.125 mm, 0.25 mm, 0.5 mm, 1 mm and 2 mm) of the active energy ray transmitting sheet have a value in the range of 200 to 500, and particularly preferably a value in the range of 300 to 490.

The reason for this is that when the image clarity has a value in such a range, active energy radiation can be transmitted through the coating layer without losing the active energy radiation in the sheet, and the second louver structure region can be formed efficiently.

Meanwhile, the image clarity can be determined according to JIS K 7374.

Furthermore, from the same viewpoint, it is preferable that the transmittance of the active energy ray transmitting sheet to light having a wavelength of 360 nm, have a value in the range of 30% to 100%, more preferably a value in the range of 45% to 95%, and particularly preferably a value in the range of 75% to 90%.

Furthermore, on the occasion of performing the second active energy ray irradiation, it is preferable to adjust the absolute value of the difference between the irradiation angle for the first active energy ray irradiation and the irradiation angle for the second active energy ray irradiation should be adjusted to a value of 1° or more.

The reason for this is that when a difference is provided to the irradiation angle as such, the light diffusion angle region in the light diffusion film thus obtainable can be expanded more effectively.

On the other hand, if the absolute value of the difference of the irradiation angle becomes excessively large, the diffused light attributable to the respective louver structure regions of the light diffusion film thus obtainable becomes completely independent, and efficient expansion of the light diffusion angle region may not be achieved.

Therefore, on the occasion of performing the second active energy ray irradiation, it is more preferable to adjust the absolute value of the difference between the irradiation angle for the first active energy ray irradiation and the irradiation angle for the second active energy ray irradiation to a value in the range of 2° to 30°, and even more preferably to a value in the range of 5° to 20°.

Furthermore, it is preferable to adjust the illuminance at the surface of the coating layer for the second active energy ray irradiation to a value in the range of 0.1 mW/cm$^2$ to 20 mW/cm$^2$.

The reason for this is that when the illuminance for the second active energy ray irradiation to a value in such a range, the second louver structure region can be formed more efficiently in the louver structure-unformed region.

That is, it is because if such illuminance has a value of below 0.1 mW/cm², it may be difficult to form the second louver structure definitely. On the other hand, it is because if such illuminance has a value of above 20 mW/cm², it is speculated that the curing rate becomes too fast, and thus the second louver structure region may not be formed effectively.

Therefore, it is more preferable to adjust the illuminance at the surface of the coating layer for the second active energy ray irradiation to a value in the range of 0.3 mW/cm² to 10 mW/cm², and even more preferably to a value in the range of 0.5 mW/cm² to 5 mW/cm².

Meanwhile, when the second active energy ray irradiation is carried out through the active energy ray transmitting sheet described above, the value of illuminance at the surface of the coating layer means the value of illuminance on the exposed surface side of the active energy ray transmitting sheet.

Furthermore, it is preferable to adjust the amount of light at the surface of the coating layer for the second active energy ray irradiation to a value in the range of 5 mJ/cm² to 300 mJ/cm².

The reason for this is that when the amount of light for the second active energy ray irradiation to a value in such a range, the second louver structure region can be formed more efficiently in the louver structure-unformed region.

That is, it is because if such amount of light has a value of below 5 mJ/cm², it may be difficult to extend the second louver structure region sufficiently from the upper section toward the lower section. On the other hand, it is because if such amount of light has a value of above 300 mJ/cm², the resulting film may undergo coloration.

Therefore, it is more preferable to adjust the amount of light at the surface of the coating layer for the second active energy ray irradiation to a value in the range of 30 mJ/cm² to 200 mJ/cm², and even more preferably to a value in the range of 50 mJ/cm² to 150 mJ/cm².

Meanwhile, according to the present invention, as described above, since the first louver structure region and the second louver structure region are formed respectively by the first active energy ray irradiation and the second active energy ray irradiation, the combination of the inclination angles of the plate-shaped regions in the respective louver structure region can be easily adjusted.

That is, only by appropriately adjusting the irradiation angles in the respective active energy ray irradiation, the combination of the inclination angles of the plate-shaped regions in the respective louver structure regions can be easily adjusted.

Meanwhile, when the second active energy ray irradiation is carried out through the active energy ray transmitting sheet described above, the value of the amount of light at the surface of the coating layer represents the amount of light on the exposed surface side of the active energy ray transmitting sheet.

Furthermore, it is also preferable to further irradiate active energy radiation separately from the first and second active energy ray irradiation, so that the amount of light would be an amount of light capable sufficiently curing the coating layer.

Since the active energy radiation at this time is intended to cure the coating layer sufficiently, it is preferable to use, not light that is parallel, but light that is random in any direction of travel between the longitudinal direction and the width direction of the film.

Furthermore, the light diffusion film after the photocuring step finally attains a usable state when the process sheet is detached.

Second Exemplary Embodiment

The second exemplary embodiment of the present invention is a light diffusion film having a first louver structure region and a second louver structure region, in which plural plate-shaped regions having different refractive indices are alternately arranged in parallel along any one direction along the film plane, the light diffusion film being obtained by a production method including the following steps (a) to (d):

(a) a step of preparing a composition for light diffusion film containing two polymerizable compounds having different refractive indices;

(b) a step of applying the composition for light diffusion film on a process sheet, and forming a coating layer;

(c) a step of subjecting the coating layer to first active energy ray irradiation in an oxygen-containing atmosphere (preferably, in an air atmosphere), and forming a first louver structure region in the lower part of the coating layer, while leaving a louver structure-unformed region in the upper part of the coating layer; and (d) a step of subjecting the coating layer to second active energy ray irradiation in anon-oxygen atmosphere, and forming a second louver structure region in the louver structure-unformed region.

Hereinafter, the second exemplary embodiment of the present invention will be described specifically, mainly based on the difference thereof from the first exemplary embodiment, with reference to the drawings.

1. First Louver Structure Region (1) Refractive Index

In regard to the first louver structure region, it is preferable to adjust the difference between the refractive indices of the plate-shaped regions having different refractive indices, that is, the difference between the refractive index of high refractive index plate-shaped regions and the refractive index of low refractive index plate-shaped regions, to a value of 0.01 or more.

The reason for this is that when the difference between such refractive indices is adjusted to a value of 0.01 or more, incident light can be stably reflected in the first louver structure region, and the incident angle dependency originating from the first louver structure region can be further enhanced.

More specifically, it is because if the difference between such refractive indices has a value of below 0.01, since the range of angle at which incident light undergoes total reflection in the louver structure is narrowed, the incident angle dependency may be excessively decreased.

Therefore, it is more preferable to adjust the difference in the refractive index between the plate-shaped regions having different refractive indices in the first louver structure region to a value of 0.05 or more, and even more preferably to a value of 0.1 or more.

Meanwhile, a larger difference between the refractive index of the high refractive index plate-shaped regions and the refractive index of the low refractive index plate-shaped regions is more preferred, but from the viewpoint of selecting the material capable of forming a louver structure, a value of about 0.3 may be considered as the upper limit.

Furthermore, in regard to the first louver structure region, it is preferable to adjust the refractive index of the plate-shaped regions having a relatively higher refractive index to a value in the range of 1.5 to 1.7.

The reason for this is that if the refractive index of the high refractive index plate-shaped regions has a value of below 1.5, the difference from the low refractive index plate-shaped regions becomes too small, and it may be difficult to obtain a desired louver structure. On the other hand, it is because if the refractive index of the high refractive index plate-shaped regions has a value of above 1.7, compatibility between the materials in the composition for light diffusion film may be decreased excessively.

Therefore, it is more preferable to adjust the refractive index of the high refractive index plate-shaped regions in the first louver structure region to a value in the range of 1.52 to 1.65, and even more preferably to a value in the range of 1.55 to 1.6.

Meanwhile, the refractive index of the high refractive index plate-shaped regions can be measured according to, for example, JIS K0062.

Furthermore, in the first louver structure region, it is preferable to adjust the refractive index of the plate-shaped regions having a relatively lower refractive index to a value in the range of 1.4 to 1.5.

The reason for this is that if the refractive index of such low refractive index plate-shaped regions has a value of below 1.4, rigidity of the light diffusion film thus obtainable may be decreased. On the other hand, if the refractive index of such low refractive index plate-shaped regions has a value of above 1.5, the difference between the refractive index of the low refractive index plate-shaped regions and the refractive index of the high refractive index plate-shaped regions becomes too small, and it may be difficult to obtain a desired louver structure.

Therefore, it is more preferable to adjust the refractive index of the low refractive index plate-shaped regions in the first louver structure region to a value in the range of 1.42 to 1.48, and even more preferably to a value in the range of 1.44 to 1.46.

Meanwhile, the refractive index in the low refractive index plate-shaped regions can be measured according to, for example, JIS K0062.

(2) Width

Figure 7A:
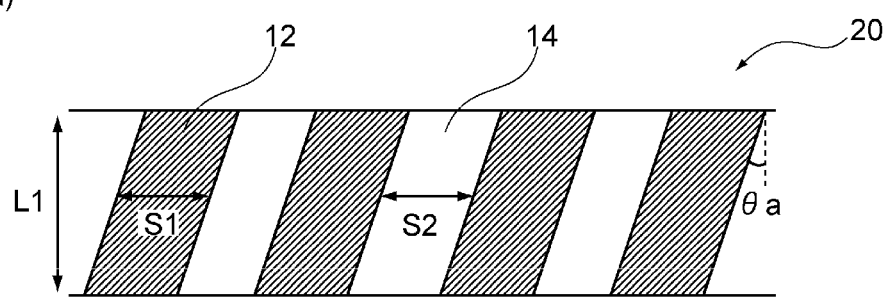
FIGS. 7(a) and 7(b) are diagrams provided to illustrate a first louver structure region.
Figure 7B:
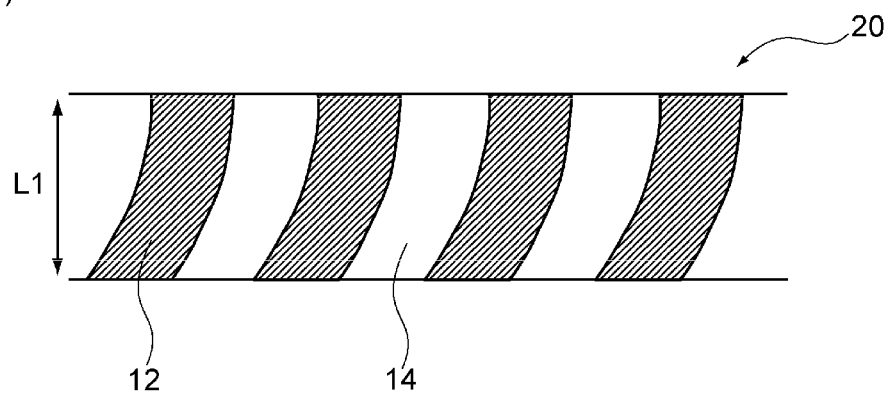

Furthermore, as illustrated in FIG. 7($a$), it is preferable, in regard to the first louver structure region 20, to adjust the widths (S1, S2) of the high refractive index plate-shaped regions 12 and the low refractive index plate-shaped regions 14 having different refractive indices, respectively to a value in the range of 0.1 µm to 15 µm.

The reason for this is that when the width of such plate-shaped regions is adjusted to a value in the range of 0.1 µm to 15 µm, incident light can be more stably reflected in the first louver structure region, and the incident angle dependency originating from the first louver structure region can be more effectively enhanced.

That is, it is because if the width of such plate-shaped regions has a value of below 0.1 µm, it may be difficult to exhibit light diffusion, irrespective of the incident angle of incident light. On the other hand, it is because if such width has a value of above 15 µm, the amount of light that travels straight within the louver structure increases, and uniformity of diffused light may be deteriorated.

Therefore, it is more preferable to adjust the width of the plate-shaped regions having different refractive indices in the first louver structure region, respectively to a value in the range of 0.5 µm to 10 µm, and even more preferably to a value in the range of 1 µm to 5 µm.

Meanwhile, the width, length or the like of the plate-shaped regions that constitute louvers can be measured by observing film cross-sections under an optical digital microscope.

(3) Inclination Angle

Furthermore, as illustrated in FIG. 7($a$), it is preferable that the plural high refractive index plate-shaped regions 12 and the plural low refractive index plate-shaped regions 14, respectively having different refractive indices, in the first louver structure region are respectively extended at a constant inclination angle θa with respect to the film thickness direction.

The reason for this is that when the respective inclination angles θa of the plate-shaped regions are set constant, incident light can be more stably reflected in the first louver structure region, and the incident angle dependency originating from the first louver structure region can be further enhanced.

Meanwhile, θa means the inclination angle (°) of the plate-shaped regions when the angle of the film surface measured in a cross-section obtained by cutting the film at a plane perpendicular to the louver structure extended along any one direction along the film plane, with respect to the normal line is defined as 0°.

More specifically, as illustrated in FIG. 7($a$), θa means a narrower angle among the angles formed by the normal line of the upper end surface of the first louver structure region and the uppermost part of the plate-shaped regions. Meanwhile, based on the inclination angle in the case in which the plate-shaped regions are inclined to the right side as illustrated in FIG. 7($a$), the inclination angle in the case in which the plate-shaped regions are inclined to the left side is indicated as a negative value.

Furthermore, as illustrated in FIG. 7($b$), it is preferable that plate-shaped regions (12, 14) having different refractive indices in the first louver structure region are bent in the upper part or in the lower part along the film thickness direction (FIG. 7($b$) shows the case in which the plate-shaped regions are bent in the lower part).

The reason for this is that when the plate-shaped regions are bent, the balance between reflection and transmission in the first louver structure region is made complicated, and the angle of aperture of diffused light can be expanded effectively.

Meanwhile, such a bent louver structure may be considered to be obtainable by decreasing the rate of the polymerization reaction caused by ultraviolet radiation in the thickness direction of the coating film.

Specifically, such a bent louver structure can be formed by suppressing the illuminance of ultraviolet radiation emitted from a linear light source, and moving the coating film in the state of being irradiated, at a low speed.

(4) Thickness

Furthermore, it is preferable to adjust the thickness of the first louver structure region, that is, the length L1 of the portion where the louver structure is present in the direction of the normal line of the film surface illustrated in FIGS. 7($a$) and 7($b$), to a value in the range of 50 µm to 500 µm.

The reason for this is that when the thickness of the first louver structure region is adjusted to a value in such a range, the length of the louver structure along the film thickness direction can be stably secured, incident light can be more stably reflected in the first louver structure region, and the uniformity of the intensity of diffused light in the light diffusion angle region originating from the first louver structure region can be further enhanced.

That is, it is because if the thickness L1 of such first louver structure region has a value of below 50 µm, the length of the louver structure is insufficient so that the amount of incident light that travels straight within the louver structure increases, and it may be difficult to obtain uniformity in the intensity of diffused light in the light diffusion angle region. On the other hand, it is because if the thickness L1 of such first louver structure region has a value of above 500 µm, when the louver structure is formed by irradiating active energy radiation to the composition for light diffusion film, the direction of progress of photopolymerization is diffused by the louver structure initially formed, and it may be difficult to form a desired louver structure.

Therefore, it is more preferable to adjust the thickness L1 of the first louver structure region to a value in the range of 70 µm to 300 µm, and even more preferably to a value in the range of 80 µm to 200 µm.

2. Second Louver Structure Region

The light diffusion film of the present invention is characterized by having a second louver structure region in which plural plate-shaped regions having different refractive indices are alternately arranged in parallel along any one direction along the film plane, in the upper side of the first louver structure region described above, along the film thickness direction.

Meanwhile, since the configuration of the second louver structure region is basically the same as the configuration of the first louver structure region, further explanation will not be repeated here.

However, from the viewpoint that the second louver structure region accomplishes an auxiliary role for the first louver structure region in connection with light diffusion, it is preferable to adjust the thickness of the second louver structure region to a value in the range of 10 µm to 200 µm, more preferably to a value in the range of 20 µm to 150 µm, and even more preferably to a value in the range of 40 µm to 100 µm.

Furthermore, it is preferable that the value obtained by subtracting the thickness of the overlapping louver structure region that will be described below, from the sum of thicknesses of the first louver structure region and the second louver structure region, is adjusted to a value of 80% or more of the film thickness (100%).

The reason for this is that when the proportion of the sum of the regions having louver structures formed therein with respect to the entire film, is adjusted to a value in such a range, uniformity of the intensity of diffused light in the light diffusion angle region originating from the first louver structure region and the second louver structure region can be enhanced more effectively.

That is, it is because if the proportion of the sum of the regions in which the louver structure is formed with respect to the entire film has a value of below 80%, the absolute amount of the louver structure is insufficient, and it may be difficult to obtain uniformity in the intensity of diffused light in a sufficient light diffusion angle region.

On the other hand, a larger proportion of the sum of the regions in which the louver structures are formed with respect to the entire film is more preferred, and therefore, the upper limit is 100%.

However, when stable reproducibility or the like is considered, the upper limit is preferably about 98%.

3. Overlapping Louver Structure Region

The light diffusion film of the present invention preferably has an overlapping louver structure region in which the upper end of the first louver structure region and the lower end of the second louver structure region overlap each other.

The reason for this is that when the light diffusion film has an overlapping louver structure region, uniformization of the intensity of diffused light in the light diffusion angle region with respect to a limited film thickness can be realized efficiently.

Hereinafter, the overlapping louver structure region will be described specifically.

(1) Shape

An overlapping louver structure region 50 is not particularly limited as long as the upper end of a first louver structure region 20 and the lower end of a second louver structure region 30 are formed to overlap each other.

More specifically, as illustrated in FIGS. 8(*a*) and 8(*b*), it is preferable that the overlapping louver structure is an overlapping louver structure region 50 in which any one end of the first louver structure region 20 and the second louver structure region 30 is brought into contact with the vicinity of the end of the plate-shaped region originating from the other louver structure region.

Alternatively, as illustrated in FIG. 8(*c*), an overlapping louver structure region 50 in which the plate-shaped regions respectively originating from the first louver structure region 20 and the second louver structure region 30 overlap in a non-contact state, is also preferred.

(2) Difference in Inclination Angle

Furthermore, it is preferable to adjust the absolute value of the difference in the inclination of the plate-shaped regions respectively originating from the first louver structure region and the second louver structure region to a value of 1° or more.

That is, as illustrated in FIG. 8(*a*), it is preferable to adjust the absolute value of the difference between the inclination angle θa of the plate-shaped regions originating from the first louver structure region and the inclination angle θb' originating from the second louver structure region, to a value of 1° or more.

The reason for this is that when the absolute value of such difference of the inclination angle is adjusted to a value of 1° or more, the light diffusion angle region can be expanded more effectively.

On the other hand, if the absolute value of such difference of the inclination angle has an excessively large value, the diffused light attributable to the respective louver structure regions of the light diffusion film thus obtainable becomes completely independent, and efficient expansion of the light diffusion angle region may not be achieved.

Therefore, it is more preferable to adjust the absolute value of the difference between the inclination angle θa of the plate-shaped regions originating from the first louver structure region and the inclination angle θb' originating from the second louver structure region, to a value in the range of 2° to 30°, and even more preferably to a value in the range of 5° to 20°.

Meanwhile, θa and θb' mean the inclination angles (°) of the plate-shaped regions when the angle of the film surface measured in a cross-section obtainable in the case of cutting the film at a plane perpendicular to the louver structure extended along any one direction along the film plane, with respect to the normal line, is designated as 0°.

More specifically, as illustrated in FIGS. 8(*a*) to 8(*c*), θa means a narrower angle among the angles formed by the normal line of the upper end surface of the first louver structure region and the uppermost part of the plate-shaped regions.

Furthermore, θb' means a narrower angle among the angles formed by the normal line of the lower end surface of the second louver structure region and the lowermost part of the plate-shaped region.

Figure 8A:
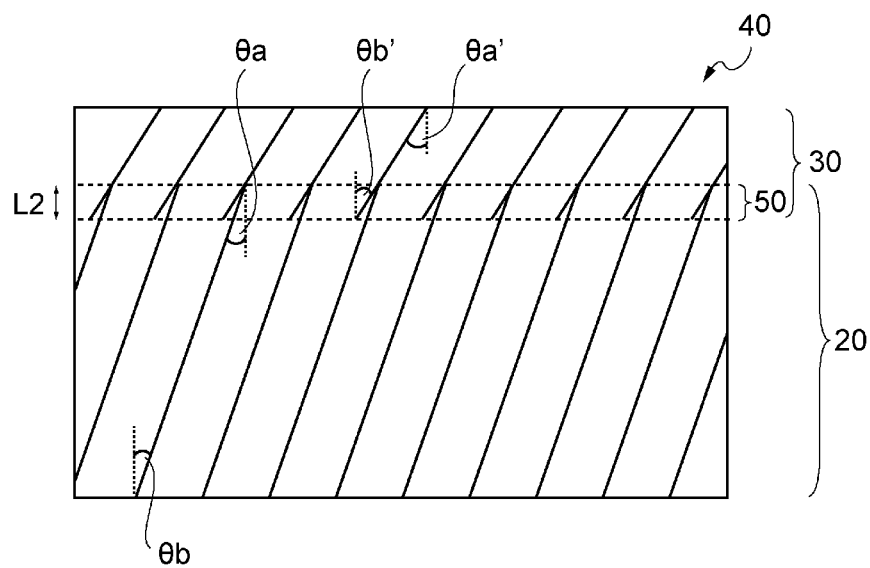
FIGS. 8(a) to 8(c) are diagrams provided to illustrate an overlapping louver structure region.
Figure 8B:
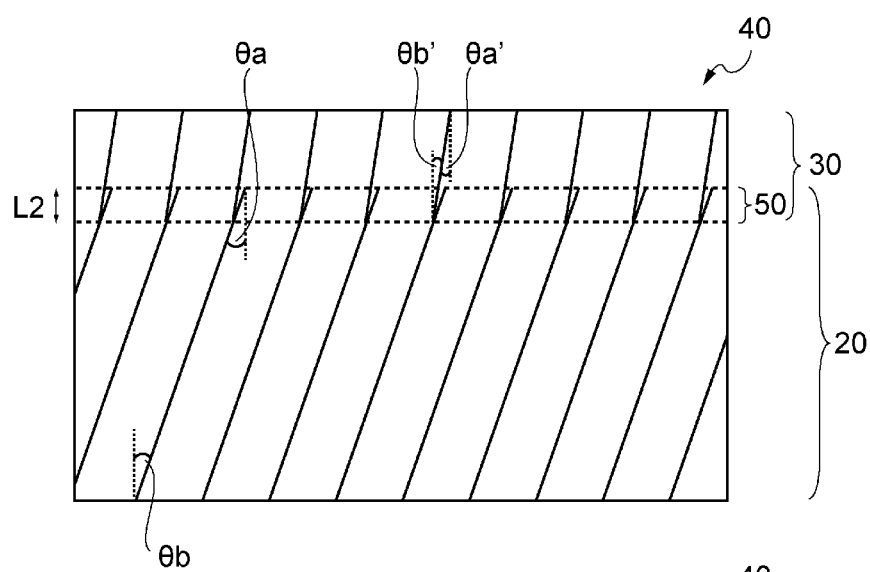
Figure 8C:
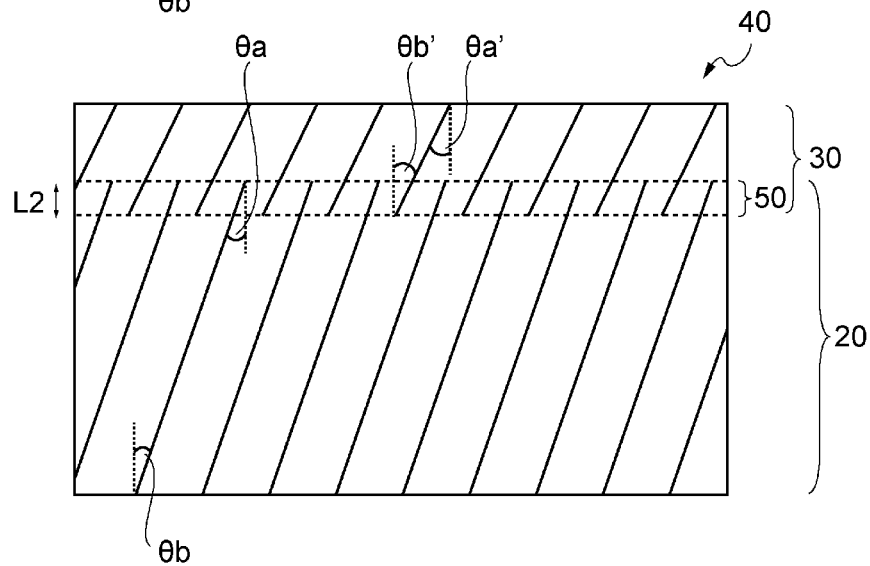

Furthermore, based on the inclination angle in the case in which the plate-shaped regions are inclined to the right side as illustrated in FIGS. 8(a) to 8(c), the inclination angle in the case in which the plate-shaped regions are inclined to the left side is indicated as a negative value.

Meanwhile, as illustrated in FIGS. 8(a) to 8(c), θb means a narrower angle among the angles formed by the normal line of the lower end surface of the first louver structure region and the lowermost part of the plate-shaped regions, and θa' means a narrower angle among the angles formed by the normal line of the upper end surface of the second louver structure region and the uppermost part of the plate-shaped regions.

Furthermore, it is preferable that the absolute value of the inclination angle of the plate-shaped regions originating from the second louver structure region is a value larger than the absolute value of the inclination angle of the plate-shaped regions having a different refractive index and originating from the first louver structure region.

The reason for this is that when such a configuration is employed, plate-shaped regions having a sufficient length can be obtained along the film thickness direction in the second louver structure region that is relatively more difficult to be formed compared with the first louver structure region, and the light diffusion angle region can be expanded more effectively.

(3) Thickness

Furthermore, it is preferable to adjust the thickness L2 of the overlapping louver structure region to a value in the range of 1 μm to 40 μm.

The reason for this is that when the thickness L2 of the overlapping louver structure region is adjusted to a value in such a range, the overlapping state of the first louver structure region and the second louver structure region in the overlapping louver structure region can be adjusted to an appropriate extent, and therefore, generation of scattered light at the connection area of the respective louver structure regions can be suppressed, while anisotropy in terms of light diffusion can be maintained more stably.

That is, it is because if the thickness L2 of the overlapping louver structure region has a value of below 1 μm, scattered light is likely to be generated in the connection area of the respective louver structure regions, and it may be difficult to stably maintain anisotropy in terms of light diffusion.

On the other hand, it is because if the thickness L2 of the overlapping louver structure region has a value of above 40 μm, the efficiency of extraction of diffused light may be decreased. That is, when the thickness L2 of the overlapping louver structure region is too long, back scattering or the like occurs in the relevant region, and it is expected to cause a decrease in the efficiency of extraction of diffused light.

Therefore, it is more preferable to adjust the thickness L2 of the overlapping louver structure region to a value in the range of 3 μm to 35 μm, and even more preferable to a value in the range of 5 μm to 30 μm.

Furthermore, it is preferable to adjust the thickness of the overlapping louver structure region to a value in the range of 0.1% to 10% relative to the film thickness (100%).

The reason for this is that when the proportion of the overlapping louver structure region in the entire film is adjusted to a value in such a range, since the overlapping state of the first louver structure region and the second louver structure region in the overlapping louver structure region can be adjusted to a more suitable range, the generation of scattered light in the louver structure-unformed area between the respective louver structure regions is suppressed, and the extraction efficiency of light diffusion can be maintained more stably.

That is, it is because if the proportion of the overlapping louver structure region in the entire film has a value of below 0.1%, there may occur more areas in which the first louver structure region and the second louver structure region do not form an overlapping structure microscopically. Therefore, scattered light is likely to be generated in the relevant structure region, and the extraction efficiency of diffused light may be decreased.

On the other hand, it is because if the proportion of the overlapping louver structure region in the entire film has a value of above 10%, the thickness of the first or second louver structure region may be relatively insufficient.

Therefore, it is more preferable to adjust the thickness of the overlapping louver structure region to a value in the range of 0.2% to 5%, and even more preferably to a value in the range of 0.5% to 4%, relative to the film thickness (100%).

4. Total Film Thickness

Furthermore, it is preferable to adjust the total film thickness of the light diffusion film of the present invention to a value in the range of 60 μm to 700 μm.

The reason for this is that if the total film thickness of the light diffusion film has a value of below 60 μm, the amount of incident light that travels straight within the louver structure region increases, and it may be difficult to exhibit light diffusion. On the other hand, it is because if the total film thickness of the light diffusion film has a value of above 700 μm, when a louver structure region is formed by irradiating the composition for light diffusion film with active energy radiation, the direction of progress of photopolymerization is diffused by the louver structure initially formed, and it may be difficult to form a desired louver structure region.

Therefore, it is more preferable to adjust the total film thickness of the light diffusion film to a value in the range of 90 μm to 450 μm, and even more preferably to a value in the range of 120 μm to 250 μm.

Furthermore, the first louver structure region and the second louver structure region may be further formed alternately to be installed as, for example, a third louver structure region and a fourth louver structure region.

5. Combination of Inclination Angles

With the light diffusion film of the present invention, the light diffusion characteristics can be changed by respectively regulating the inclination angle θa of the plate-shaped regions with respect to the film thickness direction in the first louver structure region, and the inclination angle θa' of the plate-shaped regions with respect to the film thickness direction in the second louver structure region.

That is, for example, as illustrated in FIG. 3(a), by varying the incident angle dependency exhibited by the respective louver structure regions, satisfactory incident angle dependency in connection with light transmission and diffusion can be realized, and also, the light diffusion incident angle region and the light diffusion angle region can be expanded effectively.

In this case, the inclination angle θa of the plate-shaped regions with respect to the film thickness direction in the first louver structure region is adjusted to a value in the range of −80° to 80°, while the inclination angle θa' of the plate-shaped regions with respect to the film thickness direction in the second louver structure region is adjusted to a value in the range of −80° to 80°, and it is preferable to adjust the absolute value of θa−θa' to a value in the range of 0° to 80°, more preferably to a value in the range of 2° to 30°, and even more preferably to a value in the range of 5° to 20°.

On the other hand, as illustrated in FIG. 3(b), when the incident angle dependency exhibited by the respective louver structure regions is overlapped, although the contribution to the expansion of the light diffusion incident angle region is small, since the total length of louvers in the film thickness direction is stably extended, uniformity of the intensity of diffused light in the light diffusion angle region can be expanded effectively.

In this case, the inclination angle θa of the plate-shaped regions with respect to the film thickness direction in the first louver structure region is adjusted to a value in the range of −80° to 80°, while the inclination angle θa' with respect to the film thickness direction in the second louver structure region is adjusted to a value in the range of −80° to 80°, and it is preferable to adjust the absolute value of θa−θa' to a value in the range of 0° to 20°. It is more preferable to adjust the absolute value of θa−θa' to a value in the range of 2° to 15°.

Meanwhile, in regard to the light diffusion film of the present invention, usually, from the viewpoint of maintaining anisotropy in light diffusion, the direction of the plate-shaped regions with respect to the direction along the film plane in the first louver structure region and the second louver structure region is preferably parallel or substantially parallel as illustrated in FIGS. 3(a) and 3(b); however, the direction is not intended to be limited to this, depending on the use.

Furthermore, a blank region in which louver structures are not formed may be provided at a predetermined thickness in the lower part of the first louver structure region and the upper part of the second louver structure region.

6. Use

Figure 9:
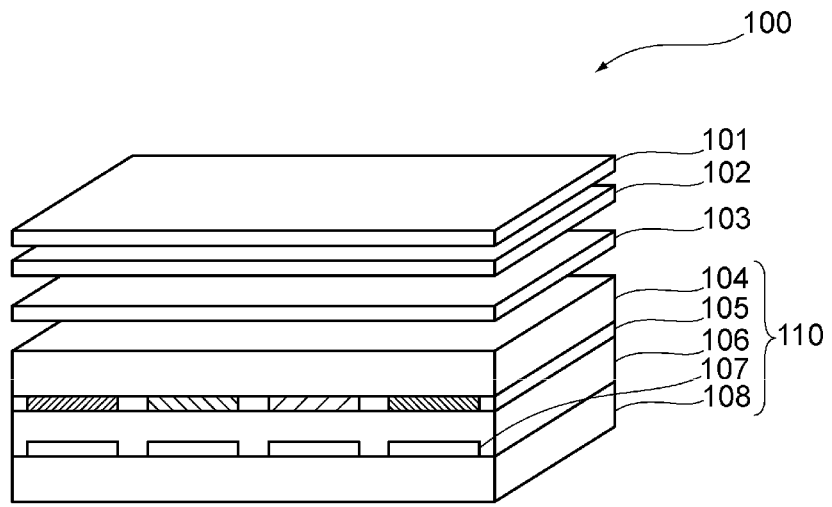
FIG. 9 is a diagram provided to illustrate an application example of the light diffusion film in a reflective liquid crystal display device.

Furthermore, as illustrated in FIG. 9, it is preferable to use the light diffusion film of the present invention in a reflective liquid crystal display device 100.

The reason for this is that when the light diffusion film of the present invention is used, the light diffusion film can concentrate external light and efficiently transmit the concentrated light, can introduce the concentrated light into the interior of the liquid crystal display device, and can efficiently diffuse the light to be utilized as a light source.

Therefore, the light diffusion film of the present invention is preferably used as a light diffusion plate 103 in a reflective liquid crystal display device 100, by being disposed on the upper surface or the lower surface of a liquid crystal cell 110 which includes glass plates (104, 108), liquid crystals 106, a mirror surface reflecting plate 107, and the like.

Meanwhile, when the light diffusion film of the present invention is applied to a polarizing plate 101 or a retardation plate 102, a wide viewing angle polarizing plate or a wide viewing angle retardation plate may be obtained.

EXAMPLES

Hereinafter, the method for producing a light diffusion film of the present invention and the like will be described in more detail by way of Examples.

Example 1

1. Synthesis of Component (B)

In a container, 2 moles of isophorone diisocyanate (IPDI) as a component (a) and 2 moles of 2-hydroxyethyl methacrylate (HEMA) as a component (c) were introduced with respect to 1 mole of polypropylene glycol (PPG) having a weight average molecular weight of 9,200 as a component (b), and then the compounds were condensed according to a conventional method. Thus, a polyether urethane methacrylate having a weight average molecular weight of 9,900 was obtained.

Meanwhile, the weight average molecular weights of polypropylene glycol and polyether urethane methacrylate are values calculated relative to polystyrene standards measured by gel permeation chromatography (GPC) under the following conditions:

GPC analyzer: manufactured by Tosoh Corp., HLC-8020

GPC column: manufactured by Tosoh Corp. (hereinafter, described in order of passage)

TSK GUARD COLUMN HXL-H

TSK GEL GMHXL (×2)

TSK GEL G2000HXL

Measurement solvent: Tetrahydrofuran

Measurement temperature: 40° C.

2. Preparation of Composition for Light Diffusion Film

Subsequently, 100 parts by weight of o-phenylphenoxyethoxyethyl acrylate (manufactured by Shin Nakamura Chemical Co., Ltd., NK ESTER A-LEN-10) having a weight average molecular weight of 268 and represented by the following formula (3) as a component (A), and 5 parts by weight of 2-hydroxy-2-methylpropiophenone as a component (C) were added to 100 parts by weight of the polyether urethane methacrylate having a weight average molecular weight of 9,900 as the component (B) thus obtained, and then the compounds were heated and mixed under the conditions of 80° C. Thus, a composition for light diffusion film was obtained.

Meanwhile, the refractive indices of the component (A) and the component (B) were measured using an Abbe refractometer [manufactured by Atago Co., Ltd., product name: "ABBE REFRACTOMETER DR-M2", Na light source, wavelength: 589 nm], according to JIS K0062, and the refractive indices were 1.58 and 1.46, respectively.

[Chemical Formula 6]

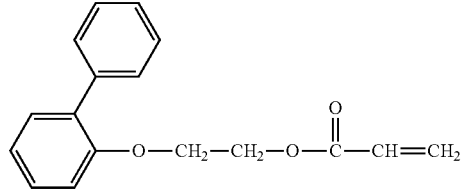

(3)

3. Application of Composition for Light Diffusion Film

Next, the composition for light diffusion film thus obtained was applied on a transparent polyethylene terephthalate film (hereinafter, referred to as PET) as a process sheet using an applicator, and thus a coating layer having a film thickness of 200 μm was obtained.

4. Photocuring of Coating Layer (1) First Ultraviolet Irradiation

Next, an ultraviolet irradiation apparatus (manufactured by Eye Graphics Co., Ltd., ECS-4011GX) in which a cold mirror for light concentration is attached to a linear high pressure mercury lamp as illustrated in FIG. 6(a), was prepared.

Subsequently, a light blocking plate was installed on a heat ray cutoff filter frame, and the system was set up such that regarding the ultraviolet radiation irradiated to the surface of the coating layer, when the normal line direction of a laminate formed from the coating layer and PET when viewed from the longitudinal direction of the linear ultraviolet lamp was designated as 0°, the angle of direct irradiation of ultraviolet radiation from the lamp ($\theta 3$ in FIG. 6(b)) would be 30°.

At this time, the height of the lamp from the coating layer was set to 500 mm, and the illuminance was set to 1.0 mW/cm$^2$, while the amount of light was set to 50 mJ/cm$^2$.

Furthermore, in order to prevent the light reflected at the light blocking plate or the like, from becoming stray light within the irradiator and affecting the photocuring of the coating layer, a light blocking plate was also provided near the conveyor so that only the ultraviolet radiation emitted directly from the lamp would be irradiated to the coating layer.

Meanwhile, the illuminance and the amount of light described above were measured by installing a UV METER i-ultraviolet radiation integrating illuminometer "UVPF-A1" manufactured by Eye Graphics Co., Ltd., attached with a light receiver, at the position of the coating layer.

Subsequently, while the coating layer was moved by a conveyor at a speed of 0.2 m/min toward the right side as viewed in FIG. 6(a), ultraviolet radiation set up as described above was irradiated thereto.

(2) Second Ultraviolet Irradiation

Next, after the first ultraviolet irradiation step using a linear light source, an ultraviolet-transmissible release film (manufactured by Lintec Corp., SP-PET382050; center line average roughness at the surface on the side of ultraviolet irradiation: 0.01 μm, haze value: 1.80%, image clarity: 425, and transmittance at a wavelength of 360 nm: 84.3%) having a thickness of 38 μm was laminated as an active energy ray-transmitting sheet on the exposed surface side of the coating layer.

Subsequently, the same ultraviolet irradiation apparatus as that used for the first ultraviolet irradiation was used, and the angle of direct irradiation of ultraviolet radiation from the lamp ($\theta 3$ in FIG. 6(b)) was set to be 16°. At this time, the height of the lamp from the coating layer was set to 500 mm, and the illuminance was set to 3.0 mW/cm$^2$, while the amount of light was set to 80 mJ/cm$^2$.

Subsequently, while the coating layer was moved by a conveyor at a speed of 0.2 m/min toward the right side as viewed in FIG. 6(a), ultraviolet radiation set up as described above was irradiated. Thus, a light diffusion film having a total film thickness of 200 μm was obtained.

Meanwhile, the film thickness of the light diffusion film was measured using a constant pressure thickness meter (manufactured by Takara Co., Ltd., TECLOCK PG-02J).

Figure 10:
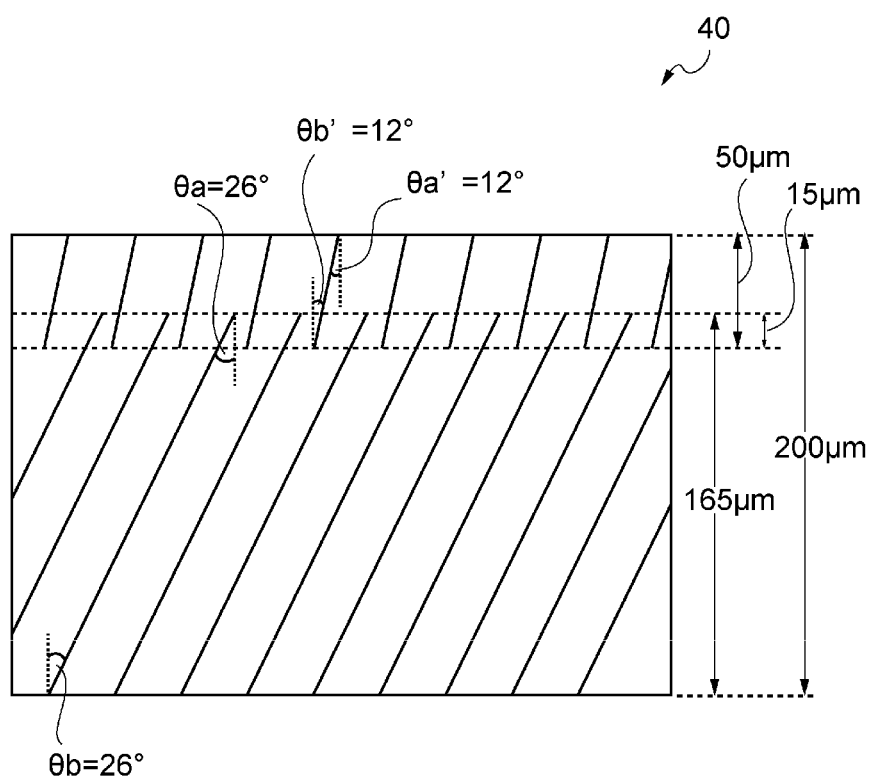
FIG. 10 is a diagram illustrating the configuration of the light diffusion film of Example 1.

Furthermore, in regard to the light diffusion film thus obtained, as illustrated in FIG. 10, it was confirmed that the plate-shaped regions in the first louver structure region were linear in shape, with the inclination angle $\theta a$ (=$\theta b$) being 26°, and the plate-shaped regions in the second louver structure region were also linear in shape, with the inclination angle $\theta a'$ (=$\theta b'$) being 12°.

Furthermore, the diagram shown in FIG. 10 is a schematic diagram illustrating a cross-section of the film when the film was cut at a plane perpendicular to the plate-shaped regions in the first louver structure region and the second louver structure region.

Furthermore, the thickness of the first louver structure region was 165 μm, the thickness of the second louver structure region was 50 and the thickness of the overlapping louver structure region as 15 μm.

5. Measurement

Figures 11A, 11B:
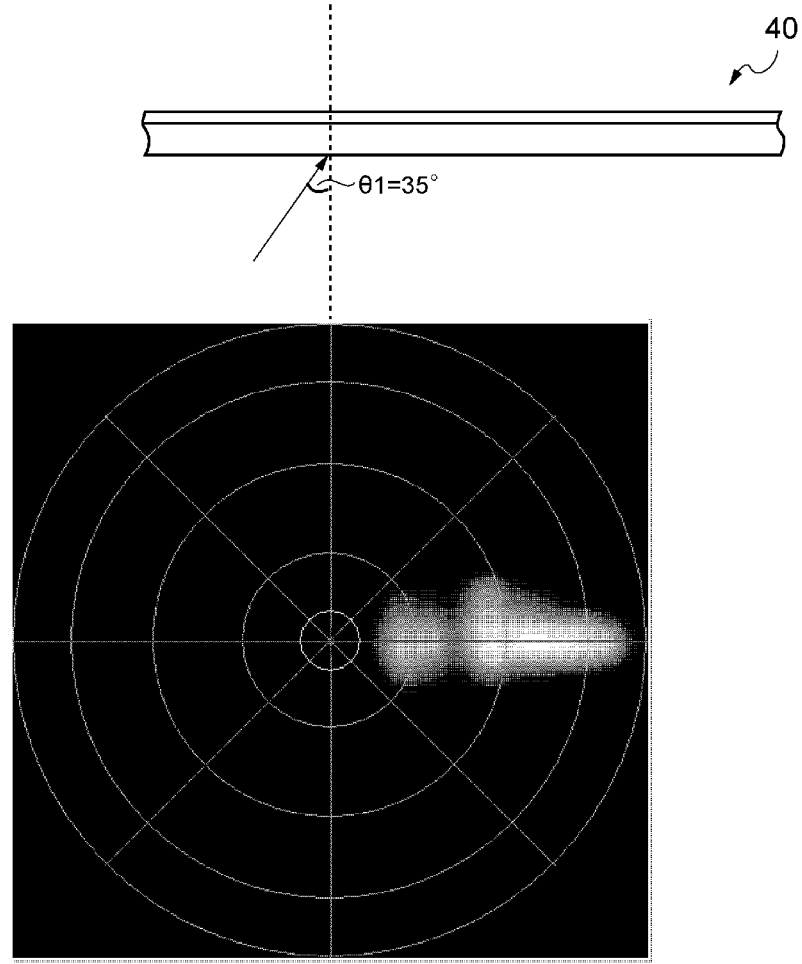
FIGS. 11(a) and 11(b) are a spectral diagram and a photograph illustrating the light diffusion characteristics of the light diffusion film of Example 1.

Using a conoscope (manufactured by Autronic-Melchers GmbH), as illustrated in FIG. 11(a), light was allowed to enter to the light diffusion film thus obtained, through the lower side of the film, that is, through the side where the first louver structure region was present, while changing the incident angle $\theta 1$ (°) to the relevant film.

The incident angle at which incident light was diffused to the largest extent was determined as $\theta 1$=35°.

In this case, a spectral chart obtained by employing the diffusion angle (°) for the diffused light diffused by the light diffusion film on the horizontal axis, and employing the intensity of diffused light (cd/m$^2$) on the vertical axis, is presented in FIG. 11(a), and a photograph of diffused light viewed from the Z-direction in FIG. 11(a) is presented in FIG. 11(b).

Furthermore, the light diffusion angle region (°) recognized from such a spectral chart is presented in Table 1.

Meanwhile, the light diffusion angle region is an angle region at which, when incident light is irradiated such that the illuminance at the light diffusion film surface would be 65 Lux, the intensity of light diffused by the light diffusion film is 100 cd/m$^2$ or higher.

Furthermore, the maximum peak value (cd/cm$^2$) for the intensity of diffused light in the light diffusion angle region is presented in Table 1.

Meanwhile, when such a maximum peak value has a value of 1,500 cd/m$^2$ or higher, it is considered that there is an area where incident light is not diffused but is transmitted directly in the light diffusion angle region, and this implies that the diffused light has poor uniformity.

Example 2

In Example 2, a light diffusion film was obtained in the same manner as in Example 1, except that the thickness of the coating layer was changed, and the irradiation angle $\theta 3$ for the second ultraviolet irradiation at the time of curing the coating layer was changed to 30°.

Figure 12:
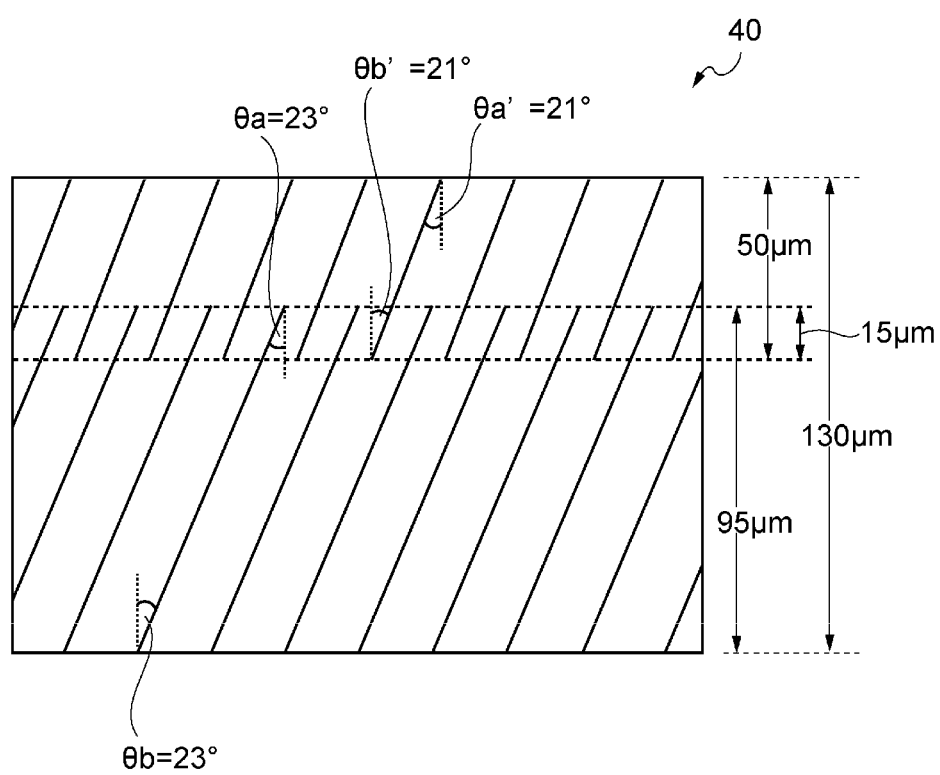
FIG. 12 is a diagram illustrating the configuration of the light diffusion film of Example 2.

Furthermore, regarding the light diffusion film thus obtained, it was confirmed that, as illustrated in FIG. 12, the plate-shaped regions in the first louver structure region were linear in shape, with the inclination angle $\theta a$ (=$\theta b$) being 23°, and the plate-shaped regions in the second louver structure region were linear in shape, with the inclination angle $\theta a'$ (=$\theta b'$) being 21°.

Furthermore, the diagram shown in FIG. 12 is a schematic diagram illustrating a cross-section of the film when the film was cut at a plane perpendicular to the plate-shaped regions in the first louver structure region and the second louver structure region.

Furthermore, the total film thickness was 130 μm, the thickness of the first louver structure region was 95 μm, the thickness of the second louver structure region was 50 μm, and the thickness of the overlapping louver structure region was 15 μm.

Figure 13:
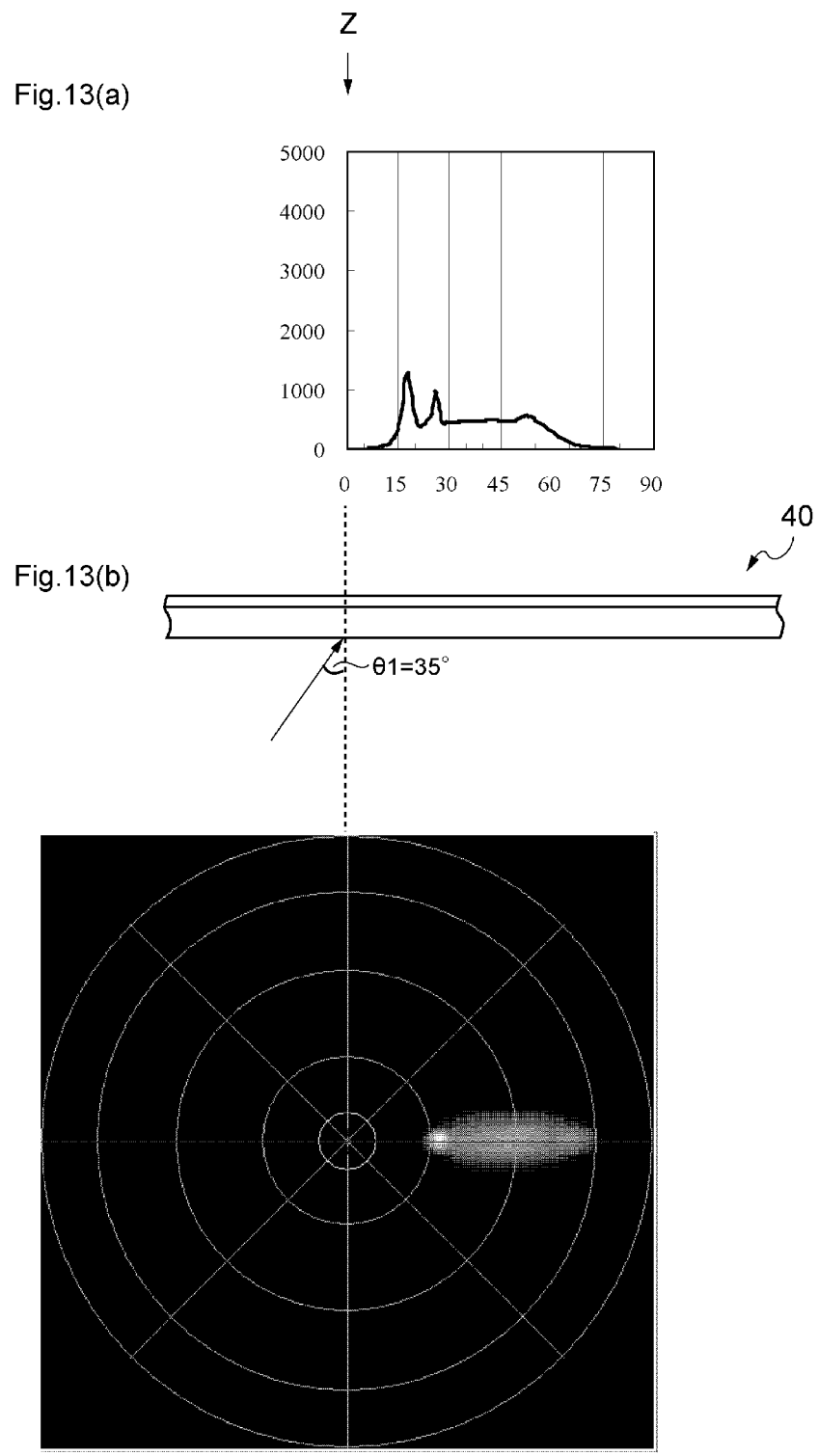
FIGS. 13(a) and 13(b) are a spectral diagram and a photograph illustrating the light diffusion characteristics of the light diffusion film of Example 2.

Furthermore, similar to Example 1, the intensity (cd/cm$^2$) of light diffused by the light diffusion film was measured using a conoscope, at the incident angle of incident light of $\theta 1=35°$. The spectral chart thus obtained is presented in FIG. 13(a), and a photograph of diffused light as viewed from the Z-direction in FIG. 13(a) is presented in FIG. 13(b).

Furthermore, the light diffusion angle region (°) and the maximum peak value (cd/cm$^2$) recognized from such a spectral chart are presented in Table 1.

Example 3

In Example 3, the thickness of the coating layer was changed, and at the same time, the irradiation angle $\theta 3$ for the first ultraviolet irradiation when the coating layer was cured was changed to 24.3°, while the illuminance was changed to 0.8 mW/cm$^2$, and the amount of light to 20 mJ/cm$^2$. Furthermore, the irradiation angle $\theta 3$ for the second ultraviolet irradiation was changed to 5°, and at the same time, the illuminance was changed to 1.4 mW/cm$^2$, and the amount of light to 40 mJ/cm$^2$.

Furthermore, a light diffusion film was obtained in the same manner as in Example 1, except that the speed of movement of the coating layer for the first and second ultraviolet irradiation was changed to 1.0 m/min.

Figure 14:
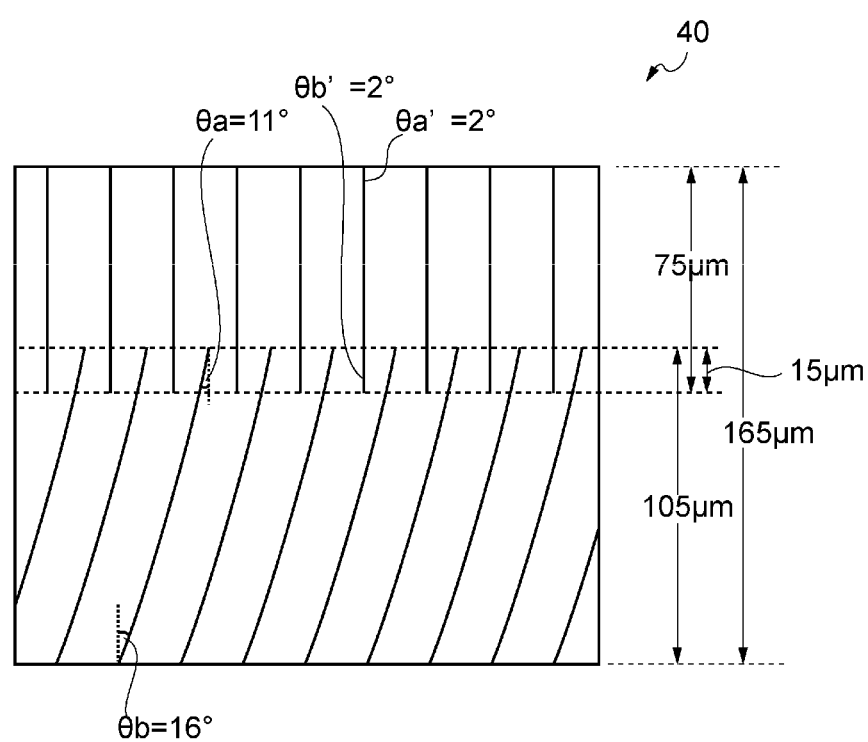
FIG. 14 is a diagram illustrating the configuration of the light diffusion film of Example 3.

Also, regarding the light diffusion film thus obtained, as illustrated in FIG. 14, it was confirmed that the plate-shaped regions in the first louver structure region were bent in shape due to low illuminance, and the inclination angles were such that $\theta a=11°$, and $\theta b=16°$.

Furthermore, it was confirmed that the plate-shaped regions in the second louver structure region were linear in shape, and the inclination angle $\theta a'$ ($=\theta b'$) was 2°.

Furthermore, the diagram shown in FIG. 14 is a schematic diagram illustrating a cross-section of the film when the film was cut at a plane perpendicular to the plate-shaped regions in the first louver structure region and the second louver structure region.

Furthermore, the total film thickness was 165 the thickness of the first louver structure region was 105 µm, the thickness of the second louver structure region was 75 µm, and the thickness of the overlapping louver structure region was 15 µm.

Figure 15A:
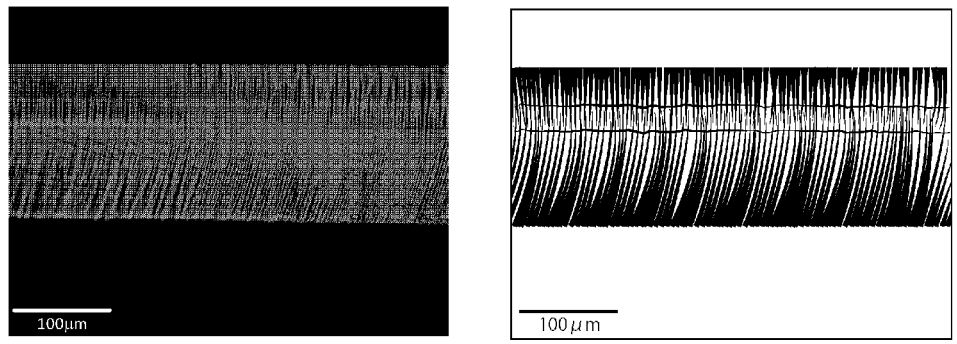
FIGS. 15(a) and 15(c) are photographs and diagrams illustrating the shapes of the cross-sections in the light diffusion film of Example 3.
Figure 15B:
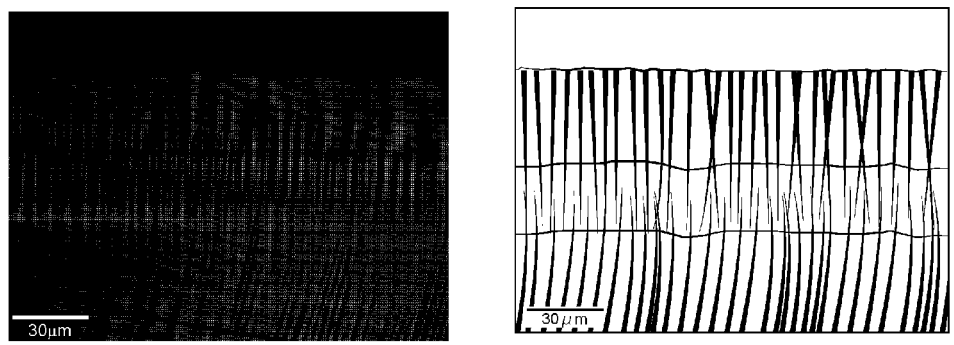
Figure 15C:
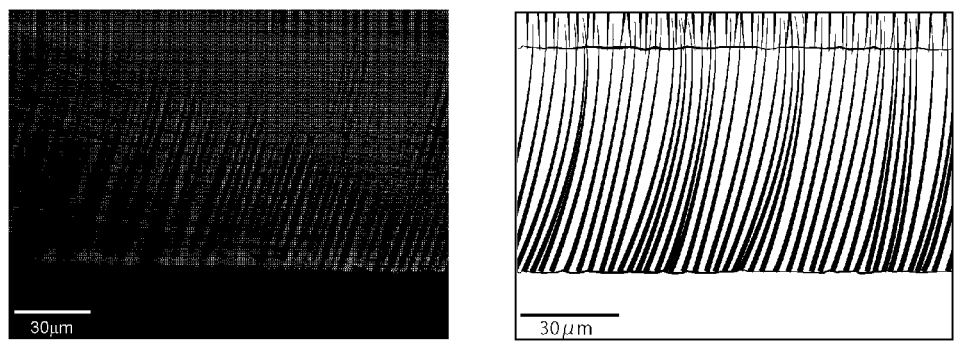

In addition, cross-sectional photographs of the light diffusion film thus obtained, and line diagrams generated from the cross-sectional photographs are presented in FIGS. 15(a) to 15(c).

Meanwhile, FIG. 15(a) presents a cross-sectional photograph and a line diagram showing the entire cross-section of the light diffusion film thus obtained; FIG. 15(b) presents a cross-sectional photograph and a line diagram showing the upper part of the film cross-section, that is, mainly the second louver structure region area; and FIG. 15(c) presents a cross-sectional photograph and a line diagram showing the lower art of the film cross-section, that is, mainly the first louver structure region area.

Figure 16A:
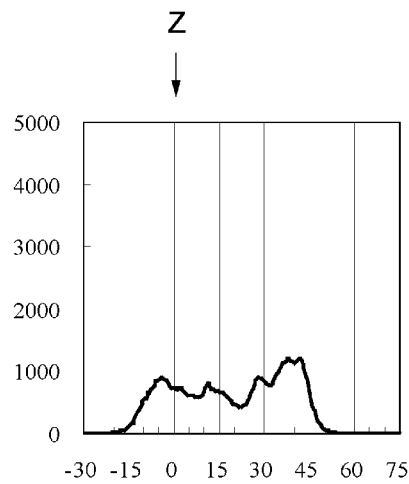
FIGS. 16(a) and 16(b) are a spectral diagram and a photograph illustrating the light diffusion characteristics of the light diffusion film of Example 3.
Figure 16B:
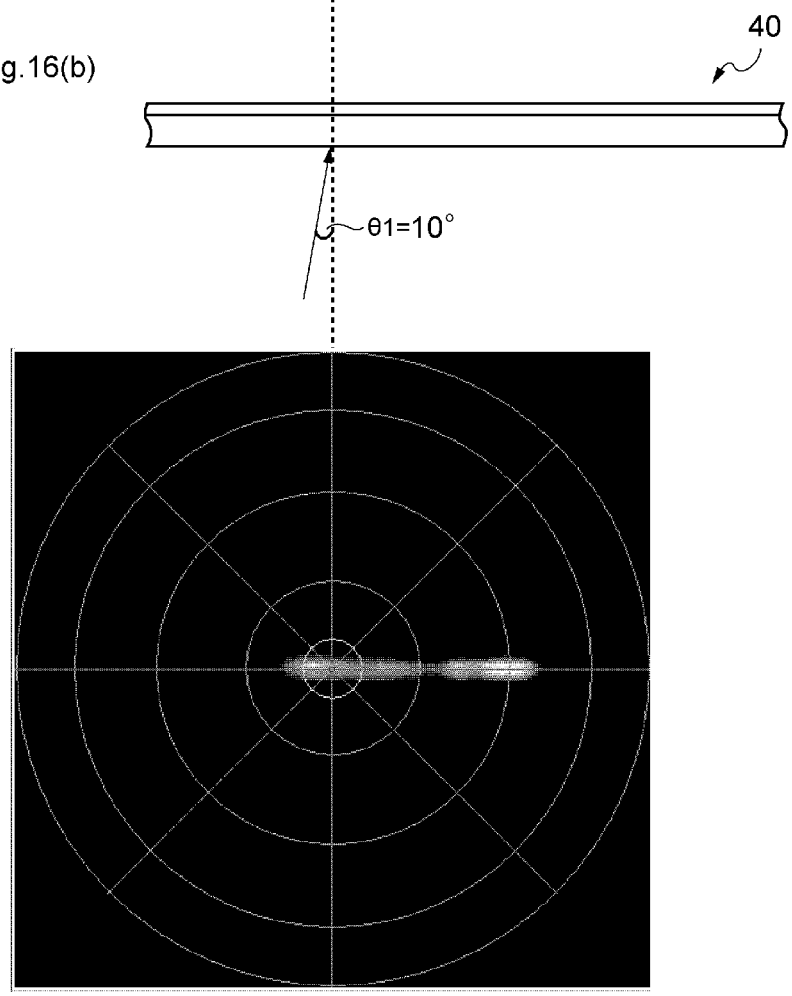

Furthermore, the intensity (cd/cm$^2$) of light diffused by the light diffusion was measured using a conoscope in the same manner as in Example 1, except that the incident angle of the incident light was set to $\theta 1=10°$. The spectral chart thus obtained is presented in FIG. 16(a), and a photograph of diffused light as viewed from the Z-direction in FIG. 16(a) is presented in FIG. 16(b).

Furthermore, the light diffusion angle region (°) and the maximum peak value (cd/cm$^2$) recognized from the spectral chart are presented in Table 1.

Comparative Example 1

In Comparative Example 1, a light diffusion film was obtained in the same manner as in Example 1, except that when the coating layer was cured, scattered light was irradiated for the second ultraviolet irradiation at an illuminance of 10 mW/cm$^2$ and an amount of light of 80 mJ/cm$^2$.

Figure 17:
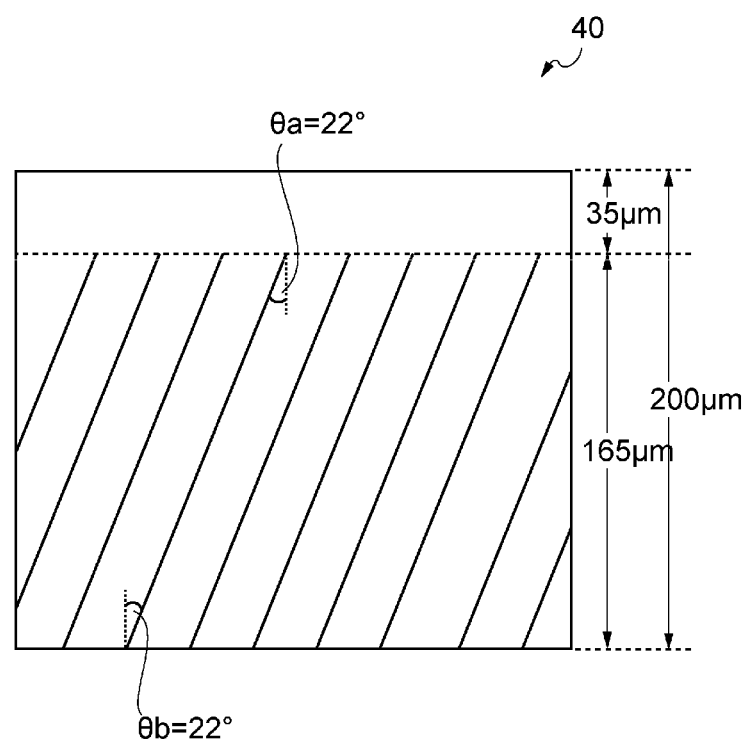
FIG. 17 is a diagram illustrating the configuration of the light diffusion film of Comparative Example 1.

Furthermore, regarding the light diffusion film thus obtained, as illustrated in FIG. 17, it was confirmed that the plate-shaped regions in the first louver structure region were linear in shape, with the inclination angle $\theta a$ ($=\theta b$) being 22°, and the second louver structure region was not formed.

Meanwhile, the diagram shown in FIG. 17 is a schematic diagram illustrating a cross-section of the film when the film was cut at a plane perpendicular to the plate-shaped regions in the first louver structure region.

Furthermore, the total film thickness was 200 µm, the thickness of the first louver structure region was 165 µm, and the thickness of the part corresponding to the second louver structure was 35 µm.

Figure 18A:
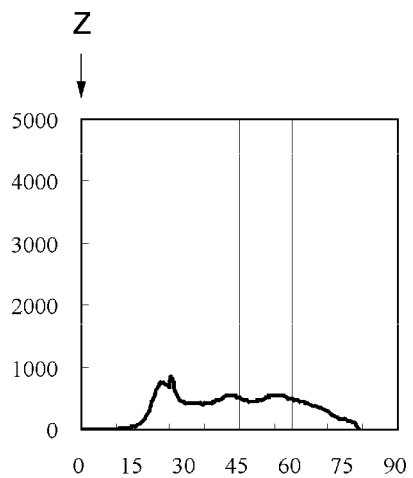
FIGS. 18(a) and 18(b) are a spectral diagram and a photograph illustrating the light diffusion characteristics of the light diffusion film of Comparative Example 1.
Figure 18B:
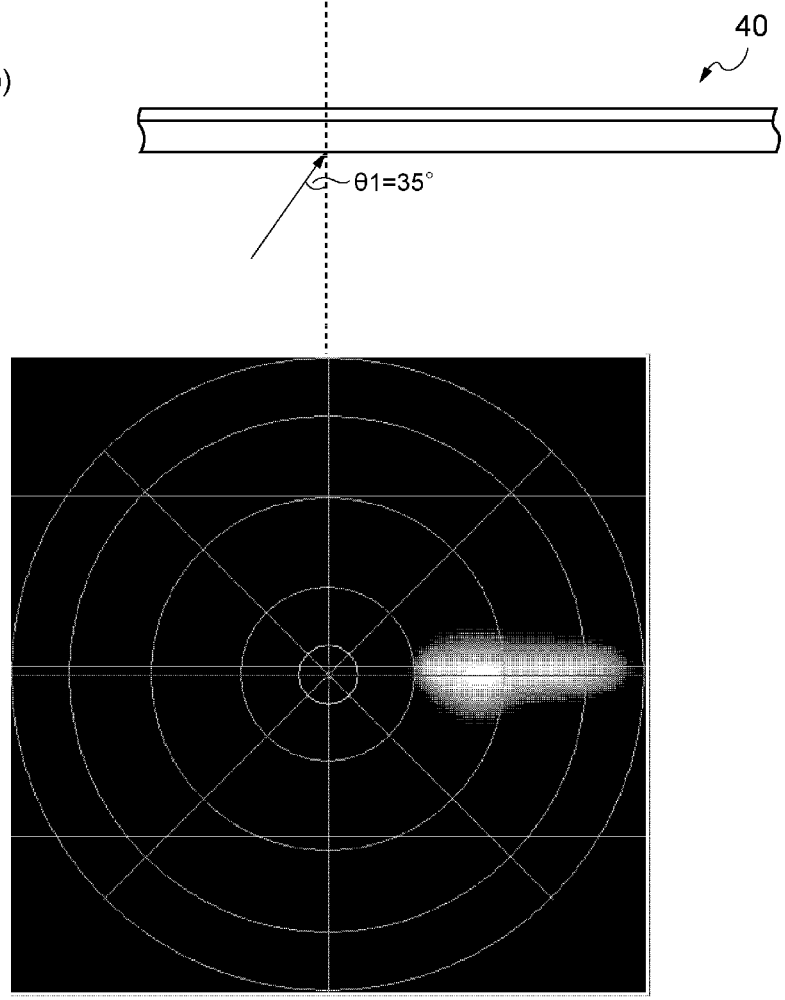

Furthermore, similarly to Example 1, the intensity (cd/cm$^2$) of light diffused by the light diffusion film was measured using a conoscope at an incident angle of incident light of $\theta 1=35°$. The spectral chart thus obtained is presented in FIG. 18(a), and a photograph of diffused light as viewed from the Z-direction in FIG. 18(a) is presented in FIG. 18(b).

Also, the light diffusion angle region (°) and the maximum peak value (cd/cm$^2$) recognized from the spectral chart are presented in Table 1.

Comparative Example 2

In Comparative Example 2, a light diffusion film was obtained in the same manner as in Example 1, except that the thickness of the coating layer was changed, and also, when the coating layer was cured, scattered light was irradiated for the second ultraviolet irradiation at an illuminance of 10 mW/cm$^2$ and an amount of light of 80 mJ/cm$^2$.

Figure 19:
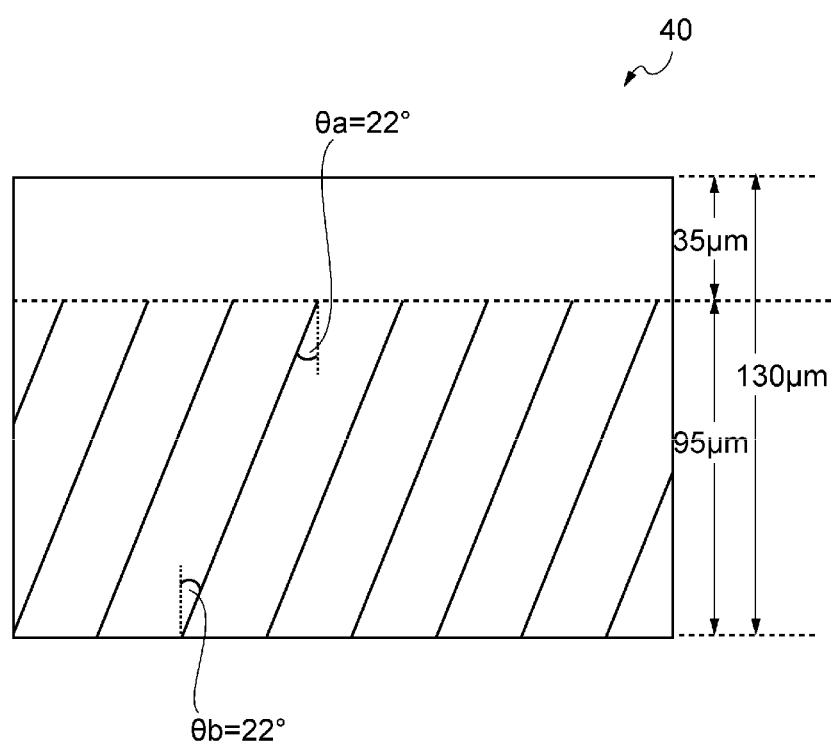
FIG. 19 is a diagram illustrating the configuration of the light diffusion film of Comparative Example 2.

Furthermore, regarding the light diffusion film thus obtained, as illustrated in FIG. 19, it was confirmed that the plate-shaped regions in the first louver structure region were linear in shape, with the inclination angle $\theta a$ ($=\theta b$) being 22°, and the second louver structure region was not formed.

Meanwhile, the diagram shown in FIG. 19 is a schematic diagram illustrating a cross-section of the film when the film was cut at a plane perpendicular to the plate-shaped region in the first louver structure region.

Furthermore, the total film thickness was 130 µm, the thickness of the first louver structure region was 95 µm, and the thickness of the part corresponding to the second louver structure region was 35 µm.

Figure 20A:
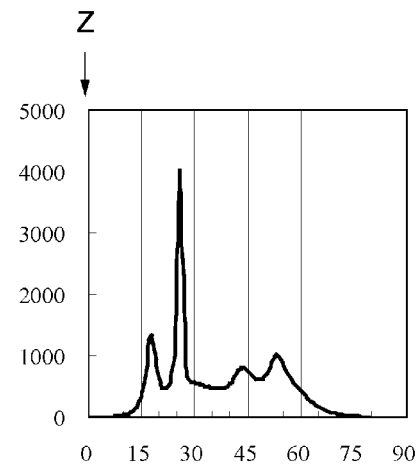
FIGS. 20(a) and 20(b) are a spectral diagram and a photograph illustrating the light diffusion characteristics of the light diffusion film of Comparative Example 2.
Figure 20B:
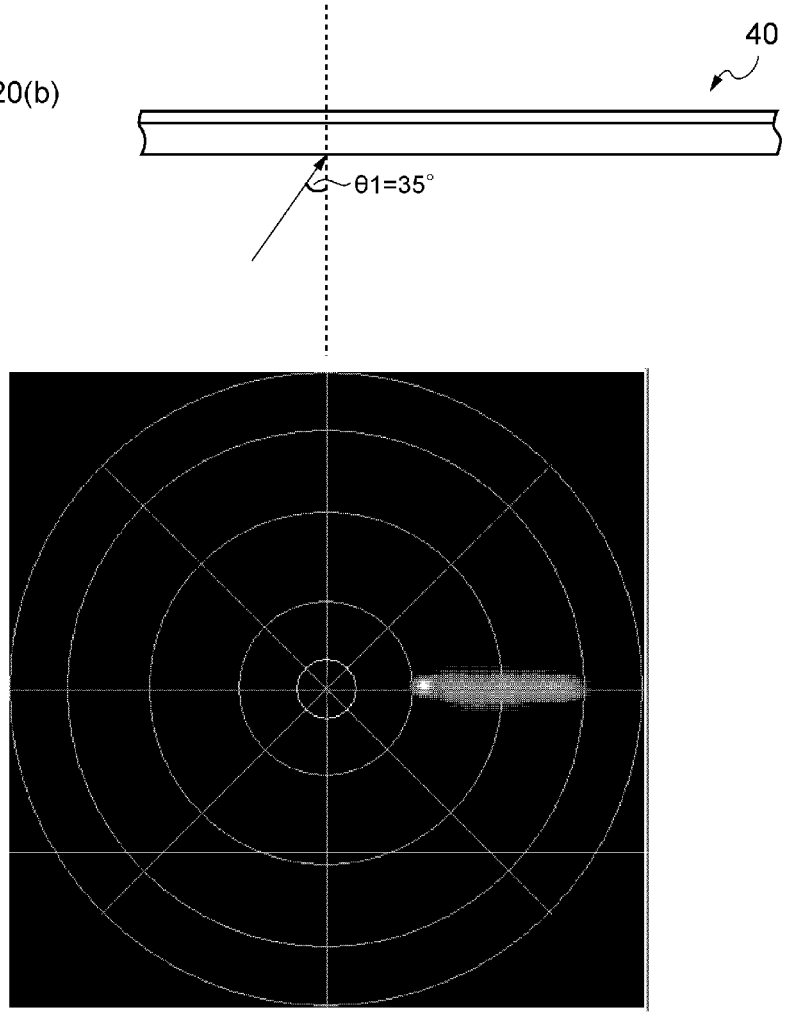

Furthermore, similar to Example 1, the intensity (cd/cm$^2$) of light diffused by the light diffusion film was measured using a conoscope at an incident angle of incident light of $\theta 1=35°$. The spectral chart thus obtained is presented in FIG. 20(a), and a photograph of diffused light as viewed from the Z-direction in FIG. 20(a) is presented in FIG. 20(b).

Also, the light diffusion angle region (°) and the maximum peak value (cd/cm$^2$) recognized from the spectral chart are presented in Table 1.

Comparative Example 3

In Comparative Example 3, the thickness of the coating layer was changed. Also, when the coating layer was cured, the irradiation angle $\theta 3$ for the first ultraviolet irradiation was changed to 24.3°, and at the same time, the illuminance was changed to 0.8 mW/cm², and the amount of light to 20 mJ/cm²; and scattered light was irradiated for the second ultraviolet irradiation at an illuminance of 10 mW/cm² and an amount of light of 40 mJ/cm².

Furthermore, a light diffusion film was obtained in the same manner as in Example 1, except that the speed of movement of the coating layer for the first and second ultraviolet irradiation was changed to 1.0 m/min.

Figure 21:
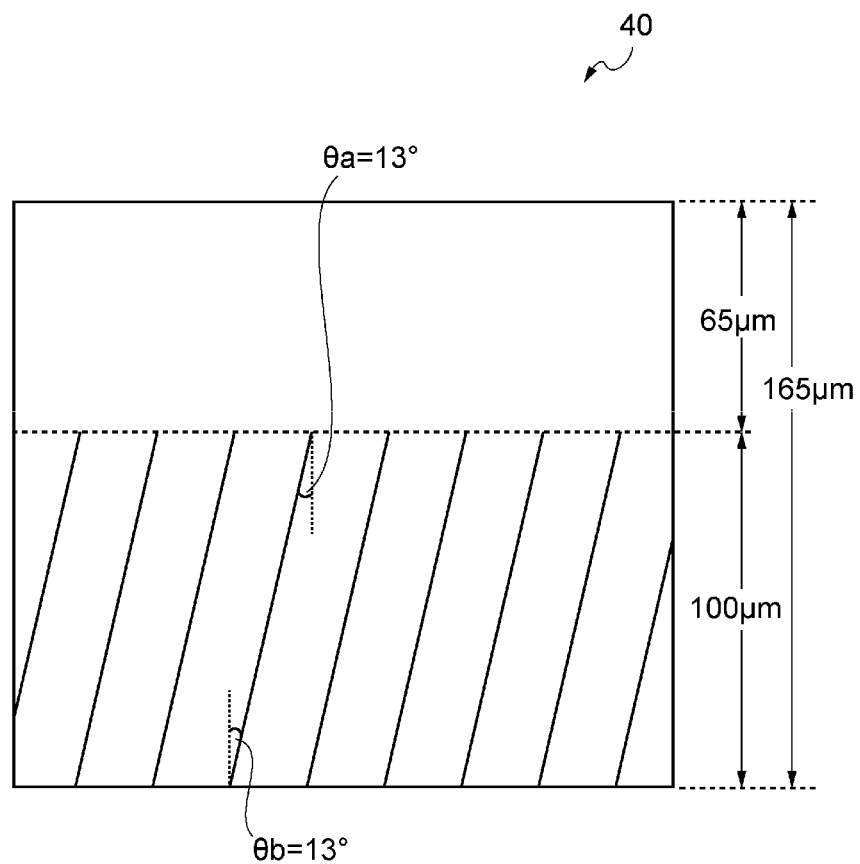
FIG. 21 is a diagram illustrating the configuration of the light diffusion film of Comparative Example 3.

Also, regarding the light diffusion film thus obtained, as illustrated in FIG. 21, it was confirmed that the plate-shaped regions in the first louver structure region were linear in shape, with the inclination angle θa (=θb) being 13°, and the second louver structure region was not formed.

Meanwhile, the diagram shown in FIG. 21 is a schematic diagram illustrating a cross-section of the film when the film was cut at a plane perpendicular to the plate-shaped region in the first louver structure region.

Furthermore, the total film thickness was 165 μm, the thickness of the first louver structure region was 100 μm, and the thickness of the part corresponding to the second louver structure region was 65 μm.

Figure 22A:
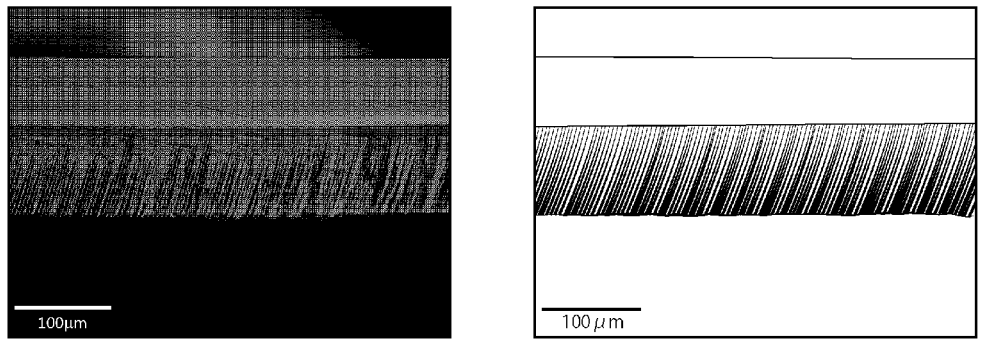
FIGS. 22(a) to 22(c) are photographs and diagrams illustrating the shapes of the cross-sections in the light diffusion film of Comparative Example 3.
Figure 22B:
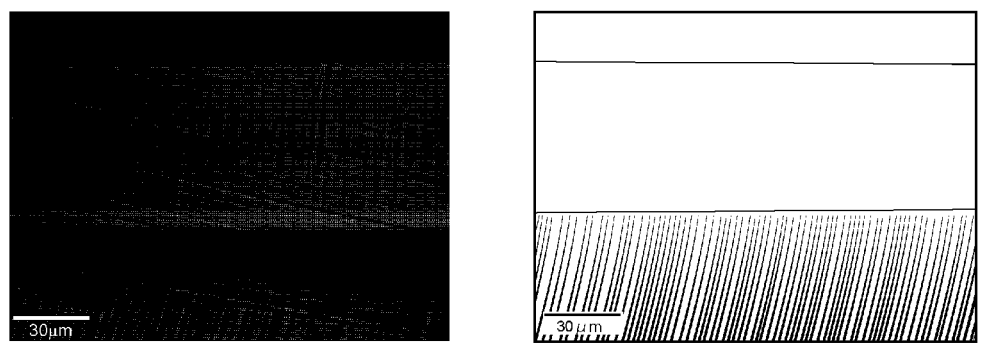
Figure 22C:
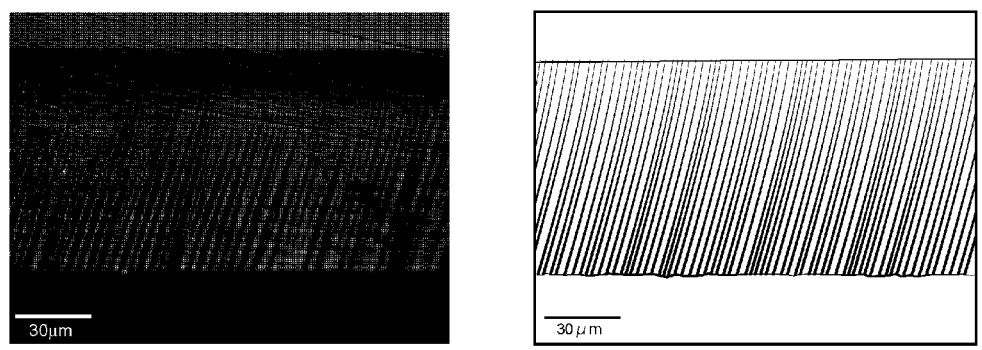

In addition, a cross-sectional photograph of the light diffusion film thus obtained, and a line diagram generated from the cross-sectional photograph are presented in FIGS. 22(a) to 22(c).

Meanwhile, FIG. 22(a) presents a cross-sectional photograph and a line diagram illustrating the entire cross-section of the light diffusion film thus obtained; FIG. 22(b) presents a cross-sectional photograph and a line diagram of the upper part of the film cross-section, that is, mainly the part corresponding to the second louver structure region; and FIG. 22(c) presents a cross-sectional photograph and a line diagram of the lower part of the film cross-section, that is, mainly the first louver structure region area.

Figure 23A:
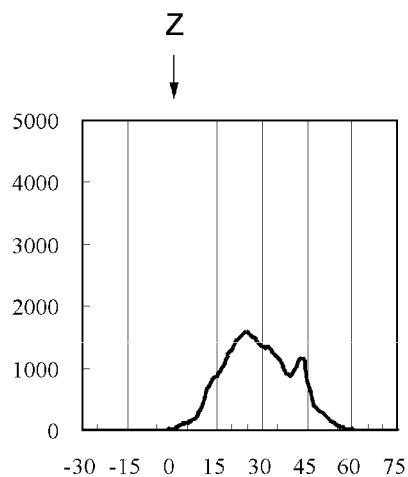
FIGS. 23(a) and 23(b) are a spectral diagram and a photograph illustrating the light diffusion characteristics of the light diffusion film of Comparative Example 3.
Figure 23B:
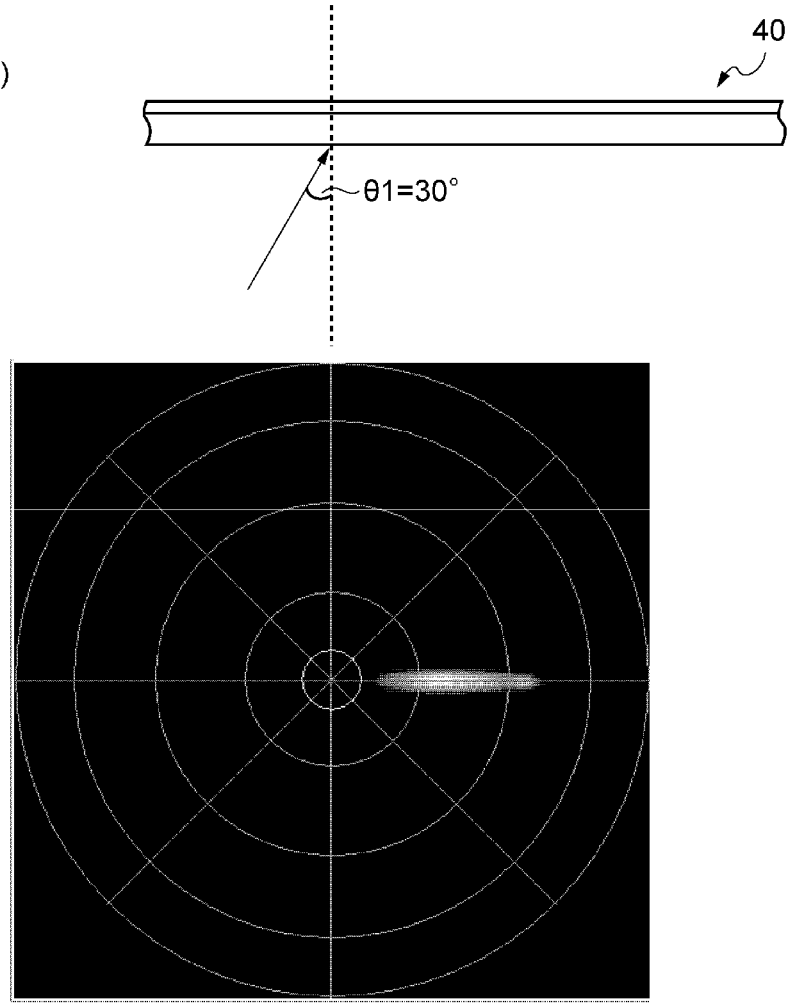
Figure 24A:
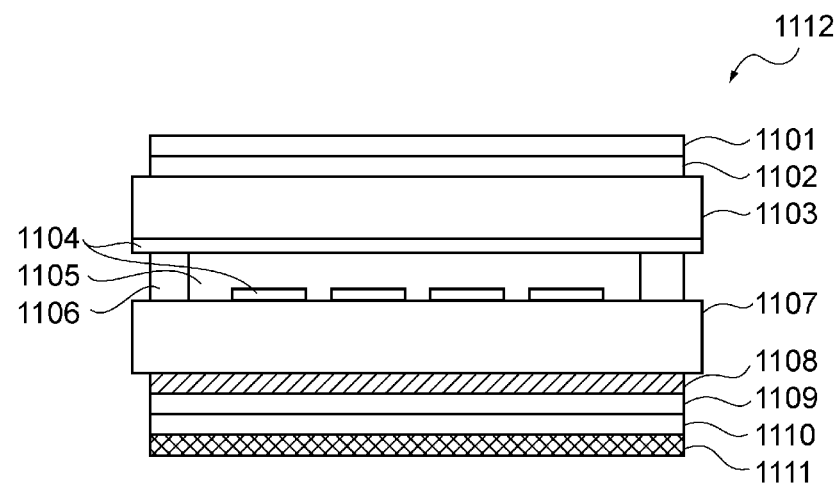
FIGS. 24(a) and 24(b) are diagrams provided to illustrate a reflective liquid crystal device using a conventional light diffusion film.
Figure 24B:
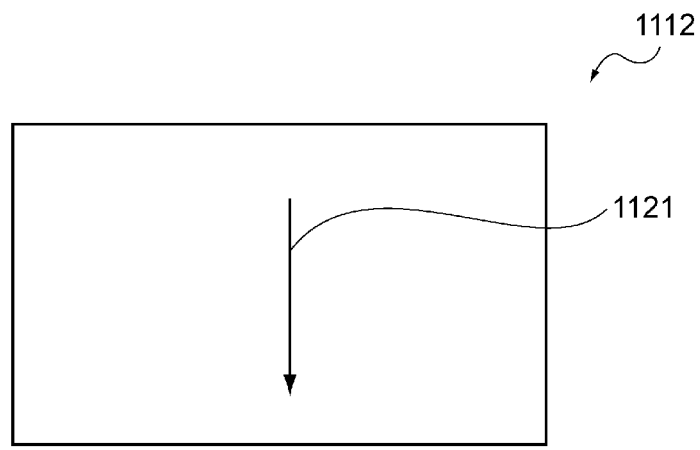

Furthermore, the intensity (cd/cm²) of light diffused by the light diffusion film was measured using a conoscope in the same meaner as in Example 1, except that the incident angle of incident light was set at θ1=30°. The spectral chart thus obtained is presented in FIG. 23(a), and a photograph of diffused light as viewed from the Z-direction in FIG. 23(a) is presented in FIG. 23(b).

Furthermore, the light diffusion angle region (°) and the maximum peak value (cd/cm²) recognized from the spectral chart are presented in Table 1.

has a widened width of the light diffusion angle region (angle of aperture of diffused light).

Furthermore, in Comparative Example 2, since the maximum peak value (cd/cm²) in the intensity of diffused light in the light diffusion angle region exceeds 1,500 cd/cm², it is considered that the film thickness as a light diffusion film is insufficient. However, in Example 2, it can be seen that with the same film thickness, the maximum peak value (cd/cm²) is suppressed to a value of below 1,500 cd/cm².

INDUSTRIAL APPLICABILITY

As described above, according to the present invention, when a method for producing a light diffusion film including predetermined steps is carried out, a first louver structure region and a second louver structure region having predetermined structures can be formed efficiently in a same film, and thereby, a light diffusion film having high uniformity of scattered light in the light diffusion angle region and having the light diffusion angle region effectively expanded, can be produced efficiently.

Furthermore, the combination of inclination angles of the plate-shaped regions in the first louver structure region and the second louver structure region having predetermined structures can be regulated easily.

Therefore, the method for producing a light diffusion film of the present invention and the like can be applied to a light control film for a reflective liquid crystal device, as well as to a viewing angle control film, a viewing angle expansion film, and a screen for projection. Thus, it is expected that the light diffusion film of the present invention would contribute markedly to an enhancement of product quality and an enhancement of product yield of these films.

EXPLANATIONS OF LETTERS OR NUMERALS

1: COATING LAYER
2: PROCESS SHEET
10: CONVENTIONAL ANISOTROPIC LIGHT DIFFUSION FILM
12: PLATE-SHAPED REGIONS HAVING RELATIVELY HIGH REFRACTIVE INDEX
13: LOUVER STRUCTURE REGION
13': BOUNDARY SURFACE OF LOUVER STRUCTURE

TABLE 1

| | First ultraviolet irradiation | | | Second ultraviolet irradiation | | | | Light diffusion angle region | | |
| --- | --- | --- | --- | --- | --- | --- | --- | --- | --- | --- |
| | Illuminance (mW/cm²) | Amount of light (mJ/cm²) | Irradiation angle θ3 (°) | Illuminance (mW/cm²) | Amount of light (mJ/cm²) | Irradiation angle θ3 (°) | Total film thickness (μm) | Angle region (°) | Angle of aperture (°) | Maximum peak value (cd/cm²) |
| Example 1 | 1.0 | 50 | 30 | 3.0 | 80 | 16 | 200 | 10 to 73 | 63 | 400 |
| Example 2 | 1.0 | 50 | 30 | 3.0 | 80 | 30 | 130 | 12 to 65 | 53 | 1300 |
| Example 3 | 0.8 | 20 | 24.3 | 1.4 | 40 | 5 | 165 | −14 to 47 | 61 | 1200 |
| Comparative Example 1 | 1.0 | 50 | 30 | 10.0 | 80 | Scattered light | 200 | 17 to 78 | 61 | 500 |
| Comparative Example 2 | 1.0 | 50 | 30 | 10.0 | 80 | Scattered light | 130 | 13 to 67 | 54 | 4000 |
| Comparative Example 3 | 0.8 | 20 | 24.3 | 10.0 | 40 | Scattered light | 165 | 8 to 51 | 43 | 1600 |

Upon considering the results described above, it can be seen that when Example 1 is compared with Comparative Example 1, or Example 3 is compared with Comparative Example 3, a light diffusion film having a second louver structure region and an overlapping louver structure region 14: PLATE-SHAPED REGIONS HAVING RELATIVELY LOW REFRACTIVE INDEX
20: FIRST LOUVER STRUCTURE REGION
20': LOUVER STRUCTURE-UNFORMED REGION
30: SECOND LOUVER STRUCTURE REGION 40: ANISOTROPIC LIGHT DIFFUSION FILM OF PRESENT INVENTION
50: OVERLAPPING LOUVER STRUCTURE REGION
100: REFLECTIVE LIQUID CRYSTAL DISPLAY DEVICE
101: POLARIZING PLATE
102: RETARDATION PLATE
103: LIGHT DIFFUSION PLATE
104: GLASS PLATE
105: COLOR FILTER
106: LIQUID CRYSTALS
107: MIRROR SURFACE REFLECTING PLATE
108: GLASS PLATE
110: LIQUID CRYSTAL CELL
120: ULTRAVIOLET IRRADIATION APPARATUS
121: HEAT RAY CUTOFF FILTER
122: COLD MIRROR
123: LIGHT BLOCKING PLATE
125: LINEAR ULTRAVIOLET RADIATION LAMP
150: ACTIVE ENERGY RADIATION

The invention claimed is:

1. A method for producing a light diffusion film having a first louver structure region and a second louver structure region, wherein comprise plural plate-shaped regions having different refractive indices alternately arranged in parallel along any one direction along the film plane, and the light diffusion film comprises an overlapping structure region in which the upper end of the first louver structure region extends into the lower end of the second louver structure region so that the upper end of the first louver structure region and the lower end of the second louver structure region overlap each other in a cross-section of the light diffusion film when the light diffusion film is cut at a plane perpendicular to the plate-shaped regions in the first louver structure region and the second louver structure region;

the method comprising the following steps (a) to (d):
 (a) preparing a composition for light diffusion film containing two polymerizable compounds having different refractive indices;
 (b) applying the composition for light diffusion film on a process sheet, and forming a coating layer;
 (c) subjecting the coating layer to first active energy ray irradiation in an oxygen-containing atmosphere, and forming the first louver structure region in the lower part of the coating layer, while leaving a louver structure-unformed region in the upper part of the coating layer; and
 (d) subjecting the coating layer to second active energy ray irradiation in a non-oxygen atmosphere, and forming the second louver structure region in the louver structure-unformed region.

2. The method for producing a light diffusion film according to claim 1, wherein regarding the first and second active energy ray irradiation, the upper surface of the coating layer is linearly irradiated with active energy radiation.

3. The method for producing a light diffusion film according to claim 1, wherein the absolute value of the difference between the irradiation angle for the first active energy ray irradiation and the irradiation angle for the second active energy ray irradiation is adjusted to a value of 1° or more.

4. The method for producing a light diffusion film according to claim 1, wherein the illuminance at the surface of the coating layer for the first active energy ray irradiation is adjusted to a value in the range of 0.1 $mW/cm^2$ to 3 $mW/cm^2$.

5. The method for producing a light diffusion film according to claim 1, wherein the amount of light at the surface of the coating layer for the first active energy ray irradiation is adjusted to a value in the range of 5 $mJ/cm^2$ to 100 $mJ/cm^2$.

6. The method for producing a light diffusion film according to claim 1, wherein the illuminance at the surface of the coating layer for the second active energy ray irradiation is adjusted to a value in the range of 0.1 $mW/cm^2$ to 20 $mW/cm^2$.

7. The method for producing a light diffusion film according to claim 1, wherein the amount of light at the surface of the coating layer for the second active energy ray irradiation is adjusted to a value in the range of 5 $mJ/cm^2$ to 300 $mJ/cm^2$.

8. The method for producing a light diffusion film according to claim 1, wherein in the step (d), the upper surface of the coating layer is subjected to the second active energy ray irradiation, while having an active energy ray transmitting sheet laminated thereon.

* * * * *